United States Patent
Wallerius et al.

(10) Patent No.: US 9,756,573 B2
(45) Date of Patent: Sep. 5, 2017

(54) UPLINK POWER CONTROL

(75) Inventors: Roger Wallerius, Savedalen (SE);
Mats-Ola Forslow, Gothenburg (SE)

(73) Assignee: TELEFONAKTIEBOLAGET LM ERICSSON (publ), Stockholm (SE)

(*) Notice: Subject to any disclaimer, the term of this patent is extended or adjusted under 35 U.S.C. 154(b) by 83 days.

(21) Appl. No.: 14/402,527

(22) PCT Filed: May 23, 2012

(86) PCT No.: PCT/EP2012/059605
§ 371 (c)(1),
(2), (4) Date: Nov. 20, 2014

(87) PCT Pub. No.: WO2013/174426
PCT Pub. Date: Nov. 28, 2013

(65) Prior Publication Data
US 2015/0173023 A1 Jun. 18, 2015

(51) Int. Cl.
*H04W 36/00* (2009.01)
*H04B 7/00* (2006.01)
(Continued)

(52) U.S. Cl.
CPC ......... *H04W 52/146* (2013.01); *H04W 36/06* (2013.01); *H04W 36/18* (2013.01);
(Continued)

(58) Field of Classification Search
CPC ... H04W 36/06; H04W 36/18; H04W 52/146; H04W 52/241; H04W 52/243;
(Continued)

(56) References Cited

U.S. PATENT DOCUMENTS

2005/0271012 A1* 12/2005 Agrawal ............... H04W 36/18
370/331
2007/0105581 A1* 5/2007 Ariyur ................ H04W 52/343
455/522
(Continued)

FOREIGN PATENT DOCUMENTS

EP 1 596 507 A1 11/2005
WO 2009/113934 A1 9/2009
(Continued)

OTHER PUBLICATIONS

PCT International Search Report, mailed Mar. 7, 2013, in connection with International Application No. PCT/EP2012/059605, all pages.
(Continued)

*Primary Examiner* — Dov Popovici
*Assistant Examiner* — Frantz Bataille
(74) *Attorney, Agent, or Firm* — Leffler Intellectual Property Law, PLLC

(57) ABSTRACT

The embodiments herein relate to a method in a centralized baseband unit (CBU) for generating a common UL-TPC stream in a network. The CBU is connected to a plurality of RRUs. Each RRU is connected to a UE via a respective RLS of a plurality of RLSs. Each respective RLS comprises at least one radio link. The CBU receives, from each RRU a stream of uplink power samples measured for each RRU on the at least one radio link comprised in each respective RLS between the UE and the plurality of RRUs. The CBU generates the common UL-TPC stream based on the received measurements of uplink power. The common UL-TPC stream is to be sent to each RRU for further transmission to the UE.

24 Claims, 16 Drawing Sheets

(51) Int. Cl.
| | |
|---|---|
| *H04B 1/30* | (2006.01) |
| *H04W 52/14* | (2009.01) |
| *H04W 52/38* | (2009.01) |
| *H04W 52/40* | (2009.01) |
| *H04W 52/54* | (2009.01) |
| *H04W 36/06* | (2009.01) |
| *H04W 36/18* | (2009.01) |
| *H04W 52/24* | (2009.01) |
| *H04W 72/04* | (2009.01) |
| *H04W 88/08* | (2009.01) |

(52) U.S. Cl.
CPC ....... *H04W 52/241* (2013.01); *H04W 52/243* (2013.01); *H04W 52/244* (2013.01); *H04W 52/386* (2013.01); *H04W 52/40* (2013.01); *H04W 52/54* (2013.01); *H04W 72/0473* (2013.01); *H04W 88/085* (2013.01)

(58) Field of Classification Search
CPC . H04W 52/244; H04W 52/386; H04W 52/40; H04W 52/54; H04W 72/0473; H04W 88/085; H04W 52/343
See application file for complete search history.

(56) References Cited

U.S. PATENT DOCUMENTS

2009/0149221 A1* 6/2009 Liu ................... H04W 88/085
 455/561
2011/0218015 A1* 9/2011 Morimoto ........... H04W 52/146
 455/522

FOREIGN PATENT DOCUMENTS

| WO | 2010/120219 A1 | 10/2010 |
|---|---|---|
| WO | 2011/040995 A1 | 4/2011 |
| WO | 2011/063839 A1 | 6/2011 |
| WO | 2012/050506 A1 | 4/2012 |

OTHER PUBLICATIONS

PCT Written Opinion, mailed Mar. 7, 2013, in connection with International Application No. PCT/EP2012/059605, all pages.
3GPP TS 25.214 V10.6.0 "Technical Specification Group Radio Access Network: Physical layer procedures (FDD)" (Release 10), Mar. 7, 2012, pp. 1-100, XP050579993.
New Postcom: "Uplink power control for uplink CoMP" 3GPP Draft R1-113044, RAN WG1, Zhuhai, Oct. 3, 2011, pp. 1-3, XP050538083.

* cited by examiner

UPLINK POWER CONTROL

TECHNICAL FIELD

Embodiments herein relate generally to a Centralized Baseband Unit (CBU) and a method in the centralized baseband unit, and to a User Equipment (UE) and a method in the user equipment. More particularly the embodiments herein relate to generating a common UpLink Transmit Power Control (UL-TPC) command stream in a communications network.

BACKGROUND

In a typical cellular network, also referred to as a wireless communication system, a user equipment communicates via a Radio Access Network (RAN) to one or more Core Networks (CNs). The network may be for example a Third Generation (3G) network based on e.g. High-Speed Packet Access (HSPA) in Wideband Code Division Multiple Access (WCDMA). HSPA refers to both improvements, in relation to Universal Mobile Telecommunications System (UMTS), made in the Down Link (DL), often referred to as High Speed Downlink Packet Access (HSDPA) and to improvements made in the uplink, often referred to as High Speed Uplink Packet Access (HSUPA). Today's release of the WCDMA standard (2×2 MIMO and 64 QAM) is a 3G technique which uses a carrier bandwidth of 5 MHz per carrier and a data transfer rate up to 42 Mbps per carrier. WCDMA used Code Division Multiple Access (CDMA). WCDMA supports Frequency Division Duplex (FDD). A FDD carrier comprises 5 MHz frequency for downlink and another 5 MHZ frequency for uplink (separation is normally 60 MHz).

A User Equipment (UE) is a device which may access services offered by an operator's core network and services outside operator's network to which the operator's RAN and CN provide access, e.g. the Internet. The user equipment may be any device, mobile or stationary, enabled to communicate over a radio channel in the communications network, for instance but not limited to e.g. mobile phone, smart phone, sensors, meters, vehicles, household appliances, medical appliances, media players, cameras, or any type of consumer electronic, for instance but not limited to television, radio, lighting arrangements, tablet computer, laptop, or PC. The user equipment may be portable, pocket-storable, hand-held, computer-comprised, or vehicle-mounted mobile devices, enabled to communicate voice and/or data, via the radio access network, with another entity, such as another mobile station or a server.

User equipments are enabled to communicate wirelessly with the cellular network. The communication may be performed e.g. between two user equipments, between a user equipment and a regular telephone and/or between the user equipment and a server via the radio access network and one or possibly more core networks and possibly the internet.

The radio access network covers a geographical area which is divided into cell areas, with each cell area being served by a base station, e.g. a Radio Base Station (RBS), which in some radio access networks is also called NodeB (NB), or base station. A cell is a geographical area where radio coverage is provided by the base station at a base station site. The base stations communicate using Radio Links (RL) with the user equipments within coverage range of the base stations.

In the DownLink (DL), i.e. in the direction from the base station to the user equipment, there are physical radio channels per cell and in the UpLink (UL), i.e. in the direction from the user equipment to the base station, there are physical radio channels per user equipment. Physical channels allocated to a particular user equipment are called dedicated. There are also common and shared physical radio channels. A radio link (to/from a user equipment) is made up of one or more dedicated physical channel. HSDPA (DL) is using shared channels (time division). HSUPA (UL) is using dedicated channels.

Mobility refers to that the user equipment is able to moves between cells, radio access technologies etc. while still keeping its connection. The user equipment may experience different degrees of mobility. The term handover refers to the transfer of a user equipment's connection from one radio link to another, where each radio link is in a separate cell. In the WCDMA standard there are two main categories of handover of a user equipment: hard and soft. From the access network point of view there is also a variant of soft handover, called a softer handover. Hard handover is a category of handover procedures where there is only one radio link (one cell) at any one time and mobility handover from one to the other is done at a synchronized point in time. Soft handover means there are two or more radio links at the same time, so that newer radio links are established before older are abandoned. Soft handover is a category of handover procedures where the radio links are added and abandoned in such manner that the user equipment always keeps at least one radio link to the UTRAN. Softer handover is a special case of soft handover where the radio links that are added and removed belong to the same base station, when one base station serves several cells like in a typical sectorized site configuration (3 sectors in 120 degree angles). The base station can then combine radio links from several cells before decoding the transferred information.

In 3G/HSPA/WCDMA a user equipment may be connected to multiple base stations via multiple radio links at the same time, to support mobility for the user equipment without interruption. As mentioned above, this is called Soft Handover (Soft HO). The set of radio links belonging to one base station involved in softer handover to a user equipment is called a Radio Link Set (RLS). According to 3GPP, a RLS is a "set of one or more Radio Links that has a common generation of Transmit Power Control (UL-TPC) commands in the DL" (vice versa, also valid for DL-TPC in the UL). Soft handover for a user equipment is made between RLSs, one RLS per base station. A RLS belongs to a base station. TPC is an abbreviation for Transmit Power Control or Transmit Power Commands and is a mechanism used in order to prevent too much unwanted interference between network cells and user radio links in a WCDMA RAN. Cell power is a shared resource in WCDMA and abundant power is undesired. In general for any radio access network power control enables reduce energy consumption. The UL-TPC mechanism dynamically adjusts the UL transmission power. For each radio link uplink, the uplink inner-loop power control continuously adjusts the user equipment transmit power in order to keep the received uplink SIR at a given SIR target. Each radio link comprises an UL and a DL. The UL carries TPC commands to control DL power (this is called DL-TPC in this document). The DL carries TPC commands to control UL power (this is called UL-TPC in this document). UL-TPC commands from different RLS may and will differ since they are separated physically and logically separated (so far).

Efficient power control is crucial in CDMA technology communications network in order to minimize interference between radio channels in the network. Power control ensures that each user equipment receives and transmits just enough energy to properly convey information while interfering with other user equipment's no more than necessary.

Closed loop power control comprises two loops: inner loop and outer loop. The inner loop power control in the uplink refers to the ability of the user equipment to adjust its output power in accordance with one or more TPC commands received in the downlink, in order to keep the received uplink Signal-to-Interference Ratio (SIR) at a given SIR target. The inner loop power control is also in the downlink and refers to the ability of the base station to adjust its output power in accordance with one or more TPC commandos received in the uplink. The user equipment generates DL-TPC commands to control the network downlink transmit power and send them in the TPC field of the uplink DPCCH. Upon receiving the TPC commands, the UTRAN adjusts its downlink DPCCH/DPDCH power accordingly. In the corresponding manner, the base station generates UL-TPC commands to control the user equipment transmit power. Upon receiving the UL-TPC commands, the user equipment adjusts its uplink power accordingly. Outer loop power control is used to maintain the quality of communication at the level of bearer service quality requirement, while using as low power as possible. The uplink outer loop power control is responsible for updating a target SIR in the base station for each individual uplink inner loop power control. This target SIR is updated for each user equipment according to the measured uplink quality, e.g. UL BLER BLock Error Ratio (other example: residual BLER alternatively retransmission rate in case of HSUPA HARQ— Hybrid Automatic Repeat Request) for each Radio Connection (RC). A radio connection is an aggregation of all radio links for one user equipment). The downlink outer loop power control is the ability of the user equipment receiver to converge to required link quality (DL BLER) set by the network in downlink. Outer loop Power control may be performed periodically or occasion (if no data block transmitted for a while, nothing to probe on), but obviously with a lower update rate than the inner loop (1500 Hz), for example every 2-3 ms (rather 2-200 ms).

A separate uplink power control loop is made by each base station, i.e. per RLS for the user equipment, to keep uplink interference low in the cell. In other words, there is one UL-TPC command stream per RLS for the user equipment, and there is a risk that these UL-TPC command streams compete against each other in case they often contradict and strive in different directions, e.g. one with a net upwards and the other with a net downwards. Each UL-TPC command stream is sent in downlink from the base station to the user equipment to control uplink power from the user equipment. In Soft HO, multiple RLS uplink power control loops are connected to same user equipment. The user equipment combines UL-TPC command streams from each RLS. The UL-TPC command streams, for a slot, may differ per RLS, due to different radio link conditions per RLS. A slot is, in WCDMA, a 10 ms radio frame which is divided into 15 slots or 0.666 ms each. The user equipment combines, e.g. by using AND, the different UL-TPC command streams in order to determine the resulting uplink power control decision. Logical AND may be used with the objective to choose the best RLS (or rather RL since user equipment cannot tell the difference between different RLS), meaning that the RL with the strongest uplink (smallest cell radio channel path loss) and this way minimize uplink interference in that cell.

There are near/far uplink/downlink imbalance problems related to the difference in cell downlink output power and this situation is becoming more common as more heterogeneous networks are deployed, e.g. mixing high power cells with low power cells. This may be referred to as Heterogeneous Network (Hetnet). The terms high power and low power cells will be described in more detail below. Generally, the UpLink Received Total Wideband Power (UL RTWP) level in a cell will experience more instability in Hetnet during Soft HO situations. Moreover it may be expected that areas selected for reinforcement with micro cells have higher density of user equipments which amplifies the imbalance problem. UL RTWP instability will result in need for larger margins for call setup and for Enhanced UL scheduling headroom HSPA, in turn leading to a lower average cell throughput in uplink. UL RTWP also affects the user equipment's call drop rate negatively.

A scenario illustrating the uplink power instability is shown in FIG. 1. In this scenario illustrated in FIG. 1, the uplink imbalance in a communications network 100 at the point where a user equipment 101 is near to exit soft HO to the right will be considerable. The imbalance is because DL and UL HO areas do not match. The imbalance increases as further away the user equipment is from the ideal UL shift HO area. FIG. 1 shows a high power cell 105a and a low power cell 105b. In FIG. 1, the high power cell 105a is synonymous with a macro cell. Furthermore, the low power cell 105b is synonymous with a micro cell (in some contexts a pico cell). A macro cell is a cell that provides radio coverage served by a high power base station. A macro cell has typically a power output in tens of watts and has a cell radius of e.g. 1-10 km. Generally, macro cells provide coverage larger than a micro cell. A micro cell is a cell that provides radio coverage served by a low power base station. A micro cell has typically a power output lower than a macro cell and a cell radius of e.g. less than 1 km. The micro cell covers a limited area such as a mall, a hotel, or a transportation hub and they are deployed in order to add network capacity in areas with very dense phone usage.

In FIG. 1, the high power cell 105a is illustrated by the base station serving the high power cell 105a and the low power cell 105b is illustrated by the base station serving the low power cell 105b. The user equipment 101 is in handover between the high power cell 105a and the low power cell 105b. The left most dotted vertical line 115 illustrates the optimal UL handover point for the user equipment 101 of equal uplink path loss. Seen from the left, the distance between the second dotted vertical line 117 and the fourth dotted vertical line 118 represents the soft handover region 120 for the user equipment 101. The third dotted vertical line 125, seen from the left, represents the optimal DL handover Point of equal down link Common Pilot CHannel (CPICH), i.e. a point for a serving cell change.

CPICH, as mentioned above, is a downlink channel broadcast by base stations with constant power and of a known bit sequence, and received by user equipments. Its power is usually between 5% and 15% of the total base station transmit power. Commonly, the CPICH power is 10% of the typical total transmit power of 43 dBm. The common pilot channel is a code channel, which is scrambled by the cell specific scrambling code. The CPICH is for aiding the channel estimation for dedicated channels and for providing the channel estimation reference for common channels. Two types of CPICH are defined, the primary and the secondary common pilot channel (P-CPICH & S-CPICH).

FIG. 2 illustrates a typical guideline of how the configuration should not look like, i.e. a wrong configuration in today's network. The power setting are balanced by setting CPICH within bounds, e.g. 5%-15% of nominal power and the difference between CPICH is set to max 4 dB. The user equipment 101 is served by a base station in a high power cell 105*a* and generates high interference in the adjacent cell, the low power cell 105*b*. The user equipment 101 is in handover between the two cells. The used handover region 201, which is downlink based, is the area where the two cells overlap. The ideal handover region 205 for the uplink, which is uplink based, is illustrated to the left of the used handover region 201.

Soft HO (Stationary, or Mobile but at Least Keeping within Soft HO Area)

A scenario comprising soft handover for a stationary, or at least not moving so much that radio links are added or deleted hence not involving UL synchronization of new radio links or RLSs, user equipment will now be described with reference to FIG. 3. In FIG. 3 and in the following description, the single underline indicates that the received downlink is ok and the double underline indicates that the received downlink is bad. An ok downlink means that it is strong and continuously decodable. A bad received downlink means that it is weak and risking times being non-decodable in a varying fading radio channel. Seen from the top, the first row in FIG. 3 illustrates the UL TPC command bit sequence for the micro cell, µRLS 301. The second row in FIG. 3 illustrates the UL TPC command bit sequence for the macro cell, mRLS 303. The third row in FIG. 3 illustrates a combination of the UL TPC command bit sequence for the micro cell µRLS 301 and for the macro cell, mRLS 303 for the user equipment, referred to as AND (UE) 305 in FIG. 3. The fourth row in FIG. 3 is a graph which illustrates the radio link uplink power, either referred as the RBS Received Signal Code Power ("UL RSCP") or the UE transmitted power ("UE TxPwr") 307 in FIG. 3. The UL-RSCP denotes the power received by the base station on a particular RL or RLS. Note that when the downlink is bad there is no AND since there is nothing to AND with, only the "all ones" UL-TPC stream in the remaining RLS.

In FIG. 3 the UL TPC command bit sequence for the micro cell RLS, µRLS 301, is exemplified to be 0101010101 0101010101 000010101010. A "0" mean decrease UL power and a "1" means increase UL power. The UL TPC command for the pRLS 301 between the dotted lines is associated with a bad downlink. The bad downlink 310 has the UL TPC command bit sequence 0101010101. The UL TPC command bit sequence for the macro cell RLS, mRLS 303, is exemplified to be 111111111111111111111111111111. When combining, by adding, the UL TPC command bit sequence for the micro cell RLS with the UL TPC command bit sequence for the macro cell RLS, the result, AND (UE) 305, for the user equipment is 0101010101 11111111 000010101010. As seen from the graph 307 in the lower part of the FIG. 3, a large uplink power spike due to fading dip in the weak downlink of that same RLS. The strongest RLS in UL is the weaker RLS in DL for the micro cell and vice versa for the macro cell. In UL is all depends on the radio channel path loss while for the DL it also depends on the DL power which is always relative to the CPICH power. The micro cell RLS keeps sending UL-TPC down-commands more often than the other RLSs.

Also without complete temporary outage of micro DL, i.e. logical AND between two inputs still possible, there will be instability and power rushes as illustrated in FIG. 5 for when "2 RL" because zeros will dominate (00001000010001001000) in the micro cell RLS while in the macro cell RLS there will be mostly ones (1110110111011110). This results in unpredictable competition between the power control loops. Compared to a pure macro cell network this will results in increased UL RTWP instability in the macro cell and especially in the micro cell. The base station received signal code power, i.e. the transmission power of the user equipment (UE TxPwr), is illustrated in the graph in the lower part of FIG. 3. It is seen that the bad downlink dips lead to a power rush in the user equipment's transmission power which creates interference and instability.

Soft HO Entry (Mobility, Involving Addition of Radio Link in New RLS)

FIG. 4 illustrates mobility of the user equipment in soft HO entry. This scenario involves time for UL synchronization of the added RLS, comparing FIG. 4 with FIG. 3. A user equipment moves out from the micro cell and enters soft handover with the macro cell, i.e. the UE moves from the coverage area of the low power node to the coverage area of the macro node, while the user equipment is still being located in the HO area. In FIG. 4, the single underline indicates an ok downlink and the double underline indicates a bad downlink. Seen from the top, the first row in FIG. 4 illustrates the UL TPC command bit sequence for the micro cell, µRLS 401. The second row in FIG. 4 illustrates the UL TPC command bit sequence for the macro cell, mRLS 403. The third row in FIG. 4 illustrates a combination of the UL TPC command bit sequence for the micro cell µRLS 401 and for the macro cell, mRLS 403 for the user equipment, referred to as AND (UE) 405 in FIG. 4. The fourth row in FIG. 4 is a graph which illustrates the radio link uplink power, either referred to as the base station Received Signal Code Power (UL RSCP) or the user equipment transmitted power, referred to as UL RSCP (UE TxPwr) 407 in FIG. 4. The UL-RSCP denotes the power received by the base station on a particular RL or RLS. After some time, uplink synchronization is achieved in the mRLS 403, denoted with UL Synch (mRLS) 410 in FIG. 4. Note that when the downlink is bad there is no AND since there is nothing to AND with, only the "all ones" UL-TPC stream in the remaining RLS.

In FIG. 4 the UL TPC command bit sequence for the µRLS 401 is exemplified to be 0101010101010101 0101010101 000010101010100101011. A bad downlink 413 in the µRLS 401 is associated with the UL TPC sequence 0101010101. In the start, when the user equipment is located only in the micro cell there is no UL TPC sequence associated with the macro cell, illustrated with a thick line 415 in the mRLS 403. When the user equipment enters soft HO with the macro cell (radio link addition), the UL-TPC power is illustrated with only ones in the row associated with the mRLS 403, i.e. the UL TPC command bit sequence for the mRLS 403 after Soft HO entry but before UL synch achieved in the macro cell is 1111111111111111111111111111.

The UL Power rushes arises and amplifies when UL synch is delayed (not ideal due to fading). The synchronization relates to Radio Link addition in a SoftHO scenario. UL synchronization will be delayed since UL path loss to the macro cell is relatively large. Before UL synchronization is achieved typically the UL TPC sequence in the old micro RLS is ideally 010101010101, while the UL TPC sequence in the new macro RLS is all ones, 1111111111. The reason for this is the logical AND between the received sequences performed in the user equipment. When the user equipment has entered soft HO with the macro cell, it performs a combining of the UL TPC bit sequences from the micro and macro cell. In the example shown in FIG. 4, the result of the combination is 0101010101 11111111 0000101010101 010010101. In the part with the bad downlink 413 in the micro cell, the ones in the macro cells are the only commands visible to the user equipment and hence the result is all ones. Compared to a pure macro cell network (traditional deployment) this will give more and longer duration UL Received Signal Strength Indicator (RSSI) spikes in the micro cell, when fading of micro RLS occurs. The UL RSCP (UE TxPwr) 407 illustrates that there is a power rush associated with the bad downlink 413 which creates interference and instability. The soft HO entry example illustrated in FIG. 4 is when the user equipment is moving from a Low Power Node to a Macro node (RL Addition), while the user equipment is still in the HO area. The scenario in FIG. 4 may also be referred to as showing UL-TPC command streams in a non-Coordinated SoftHO scenario. The downlink is exposed to fading in this scenario.

The unbalanced soft handover problem is very serious.

The larger the difference between the cell's DL powers, the worse UL cell interference and UL user equipment link instability gets. A very bad radio performance situation will arise, a very instable situation with a fading radio channel resulting in frequent toggling between two extremes:

Very high user equipment transmission power in the micro cell giving excessive SIR and severe interference. This leads to performance degradation bot for R99 uplink and Enhanced uplink, EUL).

Very low user equipment transmission power in the macro cell giving bad SIR and large risk of losing uplink synchronization. This will probably affect the drop rate of the user equipment's call sessions negatively.

Deploying Hetnet, meaning small output power cells inside coverage of large macro cells, is aiming to increase capacity and/or user data rates in a limited area, but instead it instead risks effectively worsening the performance and capacity sometimes if circumstances are unfortunate.

In a handover situation the user equipment EUL performance shall typically rely on the uplink of the micro cell despite it is often not the serving cell. Handover decisions are based on downlink power, which correlates badly to the optimal uplink handover region, see FIG. 2.

Concluding, if soft handover is necessary (softer handover not possible in the network deployment) the entire Hetnet idea with embedded small capacity enforcement cells is in jeopardy.

If the handover is a soft handover, the micro cell will have its own separate UL inner power control loop (in a separate non-serving RLS). Due to the imbalance, the two power control loops for the micro cell and for the macro cell will constantly compete against each other. One will be dominated with up commands while the other loop will be dominated with down commands.

In general it is best to make sure a critical handover border is a softer handover border. If a soft border may be transformed into a softer border it would make the instability troubles go away, because it implies having only one UL inner power control loop, i.e. the separate UL inner loop for the micro cell. Such transformation is however not always an option, either due to that the base stations are physically separated or the Centralized RAN hardware pools are already full with other softer cell neighbors (borders).

The FIG. 5 shows the impact on uplink power and SIR depending on the position of the user equipment. The macro cell, i.e. the high power node is assumed to be on the left and the micro cell, i.e. the low power node is assumed to be on the right. Starting from the top, the graphs in the first row represents the RRSI of the micro cell, denoted Micro RRSI 501 in FIG. 5. Two graphs illustrate one RLS, three graphs illustrates two RLS. The second row illustrates the SIR for the micro cell, denoted Micro SIR 503 in FIG. 5, where all three graphs illustrate two RLSs. The SIR target 505 is illustrated with a horizontal line in the graphs illustrating Micro SIR 503. The third row illustrates the SIR for the macro cell, denoted Macro SIR 507 in FIG. 5 with the SIR target 505 illustrated with a horizontal line. The Macro SIR 507 is illustrated with one graph for one RLS and three graphs for two RLSs. The fourth row illustrates the resulting handover region 510 which is seen to be balanced for the downlink, but tense for the uplink. The fifth row illustrates the ideal downlink handover region for the downlink, denoted Ideal DL HO region 513 in FIG. 5. The sixth row illustrates the ideal downlink handover region for the uplink, denoted Ideal UL HO region 515 in FIG. 5. Vertically, FIG. 5 illustrates different numbers of RLSs. The x-axis of all graphs in FIG. 5 represents the time and the y-axis in FIG. 5 represents the power. A thick vertical dotted line illustrates where the uplink is equal, dented equal UL 517 in FIG. 5. The equal uplink 517 is seen in FIG. 5 to be in the ideal UL HO region 514. Another thick vertical dotted line illustrates the micro border 519. One thick vertical dotted line illustrates the equal DL 521. A thin vertical line illustrates the macro border 523, which is seen to be at the same point as the forced macro UL border 525.

FIG. 5 shows an uplink power graph with power rushes in the micro cell in the HO region, due to use of legacy Soft HO in an UL/DL imbalance scenario. In the FIG. 5 it is seen that the ideal HO region for the uplink 515 and the ideal HO region for the downlink 513 only partly overlaps, and this causes the problem with unstable uplink power control.

SUMMARY

An objective of embodiments herein is therefore to obviate at least one of the above disadvantages and to provide improved power control in a communications network.

According to a first aspect, the object is achieved by a method in a centralized baseband unit for generating a common UL-TPC stream in a communications network. The centralized baseband unit is configured to be connected to a plurality of remote radio units. Each remote radio unit of the plurality of remote radio units is configured to be connected to a user equipment via a respective RLS of a plurality of RLSs. Each respective RLS comprises at least one radio link. The centralized baseband unit receives, from each remote radio unit a stream of uplink power samples measured for each remote radio unit on the at least one radio link comprised in each respective RLS between the user equipment and the plurality of remote radio units. The centralized baseband unit generates the common UL-TPC stream based on the received measurements of uplink power. The common UL-TPC stream is to be sent to each remote radio unit for further transmission to the user equipment.

According to a second aspect, the object is achieved by a method in a user equipment for generating a common UL-TPC stream in a communications network. The user equipment is configured to be connected to a plurality of remote radio units via a plurality of RLS. Each respective RLS comprises at least one radio link, and the plurality of remote radio units is configured to be connected to a centralized baseband unit. The user equipment receives a common UL-TPC stream in a downlink direction from the centralized baseband unit via each remote radio unit of the plurality of remote radio units using the respective RLS. The user equipment detects at least one active RLS of the plurality of RLS, performs soft combining of the detected at least one active RLS using the received common UL-TPC stream.

According to a third aspect, the object is achieved by a centralized baseband unit configured to generating a common UL-TPC stream in a communications network. The centralized baseband unit is configured to be connected to a plurality of remote radio units. Each remote radio unit of the plurality of remote radio units is configured to be connected to a user equipment via a respective RLS of a plurality of RLSs. Each respective RLS comprises at least one radio link. The centralized baseband unit comprises a receiver which is configured to receive, from each remote radio unit a stream of uplink power samples measured for each remote radio unit on the at least one radio link comprised in each respective RLS between the user equipment and the plurality of remote radio units. The centralized baseband unit comprises a processor configured to generate the common UL-TPC stream based on the received measurements of uplink power, where the common UL-TPC stream is to be sent to each remote radio unit for further transmission to the user equipment.

According to a fourth aspect, the object is achieved by a user equipment for generating a common UL-TPC stream in a communications network. The user equipment is configured to be connected to a plurality of remote radio units via a plurality of RLS, where each respective RLS comprises at least one radio link. The plurality of remote radio units is configured to be connected to a centralized baseband unit. The user equipment comprises a receiver which is configured to receive a common UL-TPC stream in a downlink direction from the centralized baseband unit via each remote radio unit of the plurality of remote radio units using the respective RLS. The user equipment comprises a processor configured to detect at least one active RLS of the plurality of RLS, and to perform soft combining of the detected at least one active RLS using the received common UL-TPC stream.

Since a centralized baseband unit generates one common UL-TPC command stream is to be sent to each remote radio unit for further transmission to the user equipment the power control is improved. Instead of sending different UL-TPC command streams from each RLS to the user equipment, the same common UL-TPC command stream is transmitted from all RLSs. This may also be referred to as a coordinated soft handover. The one common UL-TPC command stream may be generated from Signal to Interference Ratio (SIR), SIR Target and Rise over Thermal (RoT) of all involved RLSs. Different UL-TPC command streams may be combined already in the centralized baseband unit, before transmission in different RLS. The combination is made with same objective as was made in the user equipment.

Embodiments herein afford many advantages, of which a non-exhaustive list of examples follows:

When a Centralized RBS generates one common UL-TPC command stream, the RLS's involved in Soft HO for a user equipment is made to operate in a coordinated fashion with the advantage of mitigating UL power rushes due to fading.

Another advantage is that the present embodiments avoid too early loss of synchronization in a macro cell when the user equipment moves into a low power cell from the macro cell.

Another advantage of the embodiments herein is that the effective SIR Target for the Macro cell may be held lower, than the SIR Target for the micro cell.

A further advantage is that the embodiments herein suppress uplink power rushes at uplink synchronization at radio link addition and lowers the variance of uplink power, in the handover area.

The embodiments herein are not limited to the features and advantages mentioned above. A person skilled in the art will recognize additional features and advantages upon reading the following detailed description.

BRIEF DESCRIPTION OF THE DRAWINGS

The embodiments herein will now be further described in more detail in the following detailed description by reference to the appended drawings illustrating the embodiments and in which.

The drawings are not necessarily to scale and the dimensions of certain features may have been exaggerated for the sake of clarity. Emphasis is instead placed upon illustrating the principle of the embodiments herein.

DETAILED DESCRIPTION

The embodiments herein relates to a centralized baseband unit associated with multiple coordinated RLS. One common UL-TPC command stream is generated already in the centralized baseband unit, before transmitted in the downlink in respective RLS (sectors). The common UL-TPC command stream is based on that the centralized baseband unit detects a plurality of uplink with associated power levels from a plurality of remote radio units from the same user equipment. Based on the power levels in the plurality of uplink signals, the centralized baseband unit generates a common UL-TPC command stream by performing a coordinated processing of the received power levels from the plurality of remote radio units, for each respective RLS.

Figure 6:
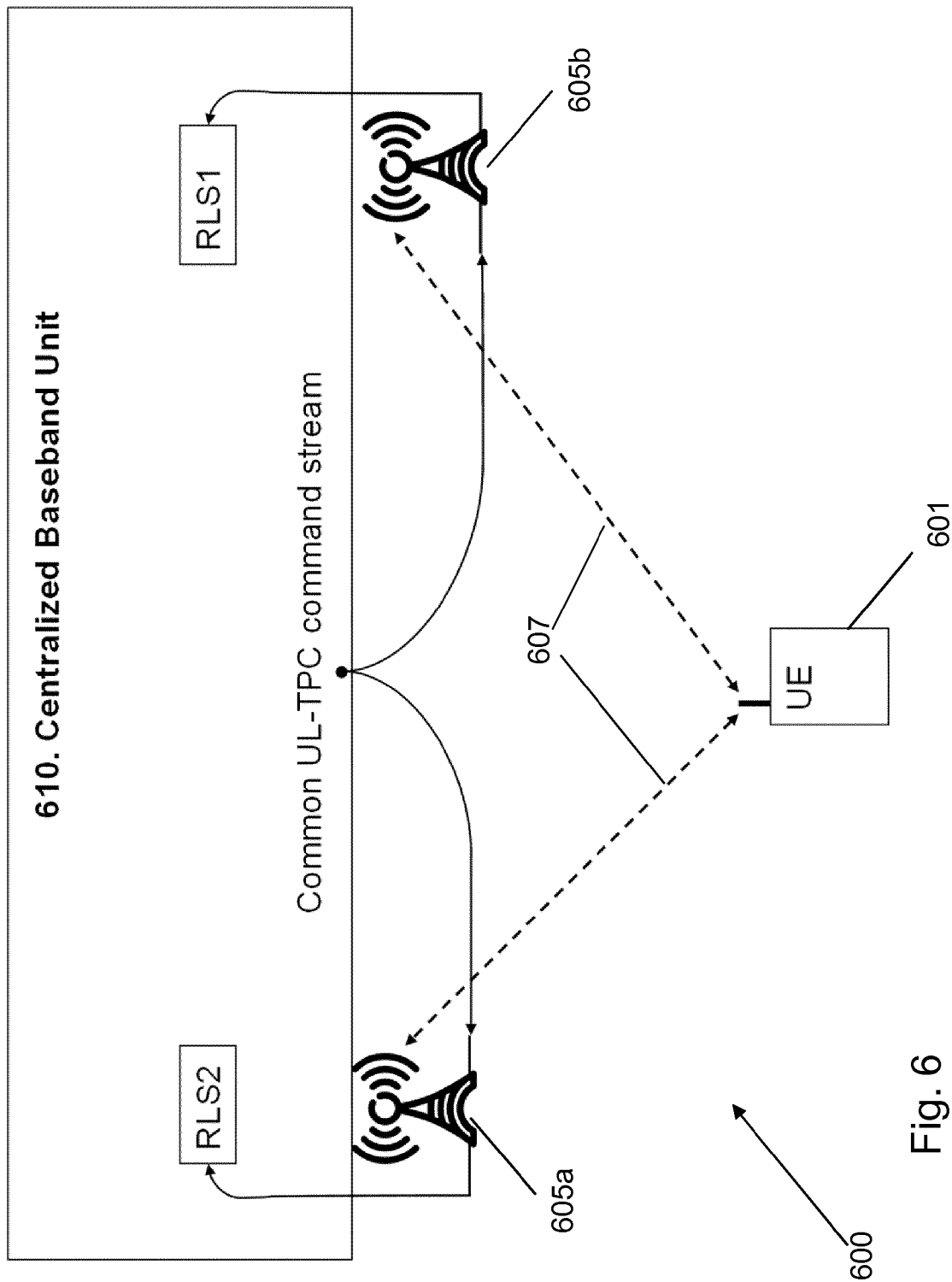
FIG. 6 is a schematic block diagram illustrating embodiments of a communications network.

FIG. 6 depicts a communications network 600 in which embodiments herein may be implemented. The communications network 100 may in some embodiments apply to one or more radio access technologies such as for example Wideband Code Division Multiple Access (WCDMA) or any other Third Generation Partnership Project (3GPP) radio access technology or any other suitable radio access technologies.

The communications network 600 comprises a user equipment 601 present in a cell and served by a plurality of Remote Radio Units (RRU) 605. A remote radio unit 605 is a network node configured to perform radio band processing. The remote radio unit 605 may comprise a plurality of radio heads and each radio head may be located at the same or different locations. In FIG. 6, the user equipment 601 is, as an example, shown to be served by two remote radio units 605, i.e. a first remote radio unit 605*a* and a second remote radio unit 605*b*. The following description will be based on the example of two remote radio units. However, the number of remote radio units 605 may be any suitable number. The first remote radio unit 605 and the second remote radio unit 605*b* are capable to communicate with the user equipment 601 via a respective RLS (RLS), illustrated with RLS1 and RLS2 in FIG. 6. Each RLS comprises at least one radio link 607. The remote radio units 605 are referred to as RRU in some of the figures. The remote radio units 605 may be located at different geographical locations. In other words, there is a scenario where one of the radio links 607 in the same RLS is not sent from the same physical remote radio unit 605. This may also be seen as each remote radio unit comprising a plurality of radio heads, wherein each radio head may be placed in different geographically positions. To clarify, a RRU relates to cells and a RLS relates to user equipment's.

The first remote radio unit 605*a* and the second remote radio unit 605*b* is connected to a centralized baseband unit 610. The centralized baseband unit 610 is common for all remote radio units, i.e. the first remote radio unit 605*a* and the second remote radio unit 605*b* and it is configured to perform baseband processing. The centralized baseband unit 610 may also be seen as a centralized radio base station comprising a plurality of NodeBs or it may be seen as comprising the baseband processing belonging to a plurality of NodeBs. As each remote radio unit 605 serves a cell, the centralized baseband unit 610 may also be seen as responsible for the cells served by the remote radio unit 605, i.e. a plurality of cells. In an example embodiment, the number of cells may be 100. In other words, the centralized baseband unit 610 acts as a "hotel" for the plurality of cells. Traditionally, a base station comprised both radio band and baseband processing. However, in the embodiments herein these two functions are performed in separate units. The centralized baseband unit 610 performs the baseband processing and the remote radio units perform the radio band processing. The centralized baseband unit 610 and the remote radio units are physically separated, e.g. by several kilometers, and connected with high speed links, e.g. fiber optical cables. The centralized baseband unit 610 is referred to as CBU in some of the figures.

The user equipment 601 may be any suitable communication device or computational device with communication capabilities capable to communicate with a base station over a radio channel, for instance but not limited to mobile phone, smart phone, personal digital assistant (PDA), tablet computer, laptop, MP3 player or portable DVD player (or similar media content devices), digital camera, or even stationary devices such as a PC. A PC may also be connected via a mobile station as the end station of the broadcasted/multicasted media. The user equipment 601 may also be an embedded communication device in e.g. electronic photo frames, cardiac surveillance equipment, intrusion or other surveillance equipment, weather data monitoring systems, vehicle, car or transport communication equipment, etc. The user equipment 601 is referred to as UE in some of the figures.

The method for generating a common UL-TPC command stream in the communications network 600, according to some embodiments will now be described with reference to the combined signaling diagram and flowchart depicted in FIG. 7. Multiple received power levels of uplinks are combined to agree on a common decision (increase or decrease the power) and send the same information, i.e. one common UL-TPC command stream, in each RLS, over the downlink in each RLS. The method comprises the following steps, which steps may as well be carried out in another suitable order than described below.

Step 701

The first remote radio unit 605*a* and the second remote radio unit 605*b* each measures a stream of uplink power samples on the at least one radio link 607 comprised in each respective RLS between the user equipment 601 and the first remote radio unit 605*a* and the second remote radio unit 605*b*. In other words, the first remote radio unit 605*a* and the second remote radio unit 605*b* samples the radio signal in the uplink in the whole baseband frequency band.

Step 702

The first remote radio unit 605*a* and the second remote radio unit 605*b* each transmit their measured stream of uplink power samples to the centralized baseband unit 610, i.e. the sampled radio signals in the uplink in the whole baseband frequency band. The first remote radio unit 605*a* and the second remote radio unit 605*b* makes a digital copy of the sampled radio signal which is transmitted to the centralized baseband unit 610.

Step 703

The centralized baseband unit 610 receives, from each of the first remote radio unit 605*a* and the second remote radio unit 605*b*, the stream of uplink power samples measured for each remote radio unit 605. Each uplink power sample from the plurality of remote radio units 605 is measured to have different power levels.

Step 704

The centralized baseband unit 610 generates one common UL-TPC command stream based on the received measurements of uplink power. The common UL-TPC command stream is signals in downlink sent from the centralized baseband unit 610 to the user equipment 601 via at least one RLS. Thus, the communications network 600 has coordinated UL-TPC. One way of expressing the common UL-TPC command stream is as follows:

$$\text{Common UL-TPC}=f(\text{SIR1, SIR2, SIR Target, RoT1, RoT2, pilot BER})$$

This means that the common UL-TPC command stream may be generated based on at least one of the parameters SIR1, SIR2, SIR Target, RoT1, RoT2, pilot BER. For example, depending on whether the received effect, using the SIR parameter, is determined to be below or over the SIR target, the UL-TPC command stream will be an UP command (one) or a DOWN command (zero).

The common UL-TPC command stream may be generated by combining a UL-TPC1 command stream for the first remote radio unit 605a and a second UL-TPC2 command stream for the second remote radio unit 605b as follows:

Common UL-TPC=AND(UL-TPC1,UL-TPC2)

The above are some examples of how the common UL-TPC command stream may be generated. The skilled person will understand that there are numerous other ways of generating the common UL-TPC command stream.

Figure 8:
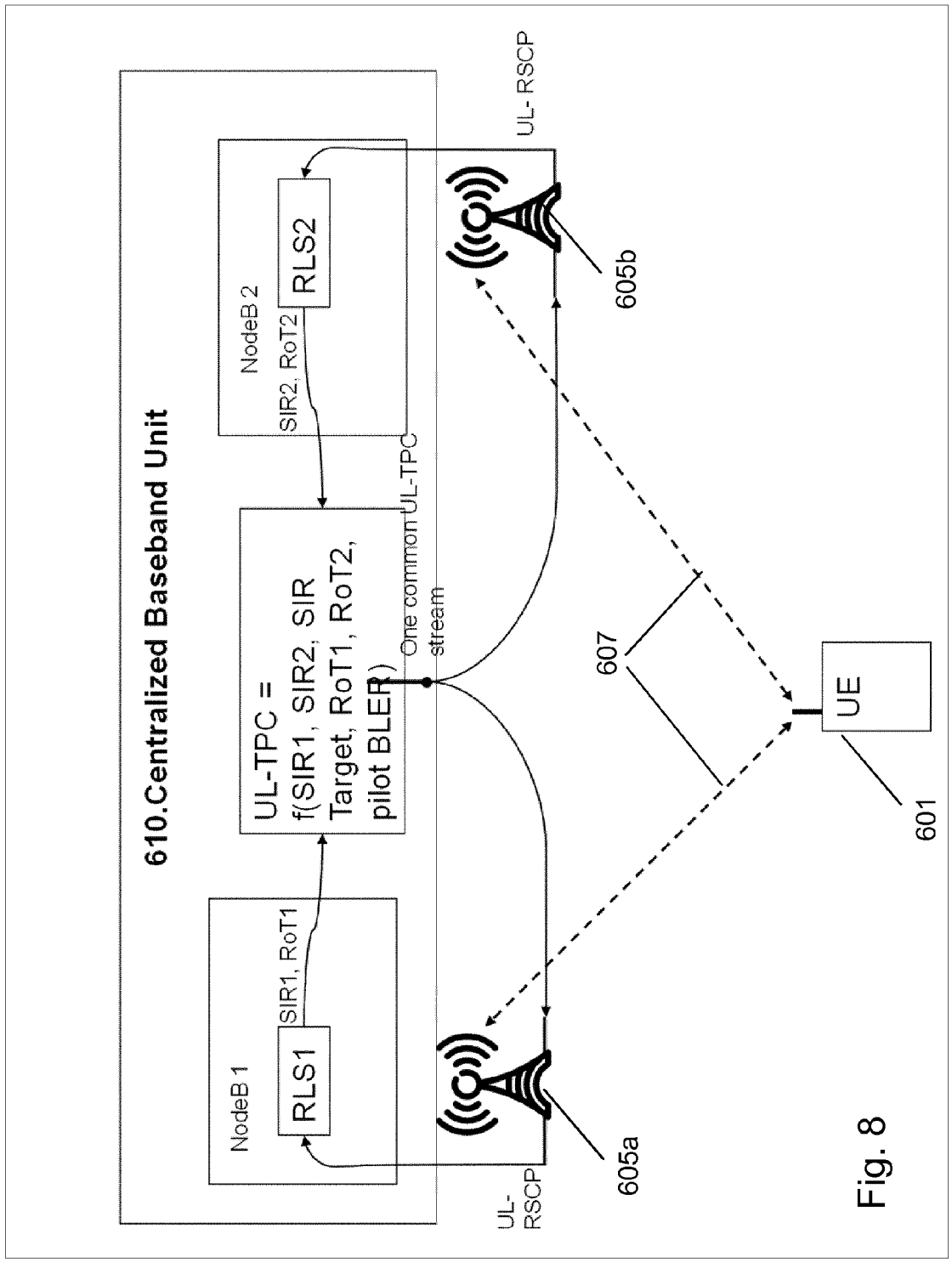
FIG. 8 is a schematic block diagram illustrating embodiments of a communications network.

The centralized baseband unit 601 may use different methods for generating the common UL-TPC command stream. One example method is illustrated in FIG. 8 where the centralized baseband unit 601 uses a plurality of parameters for generating the common UL-TPC command stream. The parameters may be the SIR associated with the first remote radio unit 605a (SIR1), SIR associated with the second remote radio unit 605b (SIR2), the SIR Target and a pilot BER. BER is short for Bit Error Rate and is only related to physical channel known pilot sequences. BER is the number of bit errors divided by the total number of transferred bits during a certain time interval. The pilot BER should not go below a certain threshold on the macro cell. In some embodiments, the parameter Rise over Thermal (RoT) associated with the first remote radio unit 605a (RoT1) and the RoT associated with the second remote radio unit 605b RoT2 are also taken into account when generating the common UL-TPC command stream. There may be different functions that are using the above exemplified parameters in order to generate the common UL-TPC command stream. The common UL-TPC command stream is to be used for coordinated soft handover.

Figure 9:
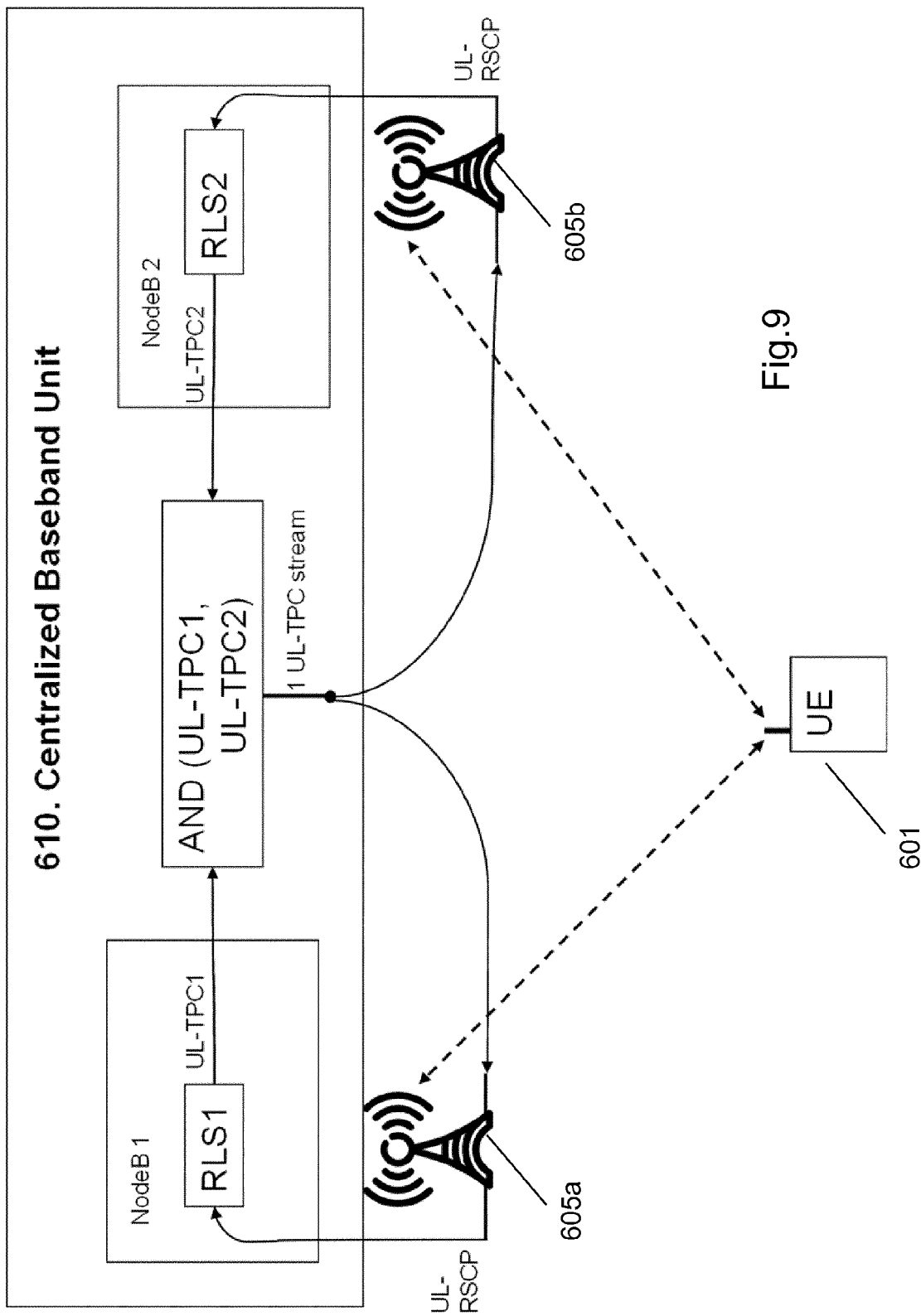
FIG. 9 is a schematic block diagram illustrating embodiments of a communications network.

Another example method for generating the common UL-TPC command stream is illustrated in FIG. 9. In this example, the centralized baseband unit 601 generates one UL-TPC1 stream for the first remote radio unit 605a and one UL-TPC2 stream for the second remote radio unit 605b. Then, the centralized baseband unit 601 combines the UL-TPC1 and the UL-TPC2 by using for instance an AND function. The result of the combining is the common UL-TPC command.

Returning to FIG. 7.

Step 705

The centralized baseband unit 610 transmits the common UL-TPC command stream to the first remote radio unit 605a and the second remote radio unit 605b using the respective RLS.

Step 706

Each of the first remote radio unit 605a and the second remote radio unit 605 transmits the common UL-TPC command stream in a downlink direction to the user equipment 601.

Step 707

The user equipment 601 receives the common UL-TPC command stream from the first remote radio unit 605a and the second remote radio unit 605b.

Step 708

The user equipment 601 detects at least one active RLS of the plurality of RLS.

Step 709

The user equipment 601 performs soft combining of only the detected at least one active RLS using the received common UL-TPC command stream and decodes the soft combined RLS using only one decoding resource in the user equipment 601. Thus, the receiving function of the user equipment 601 is simplified, i.e. the diversity function used by prior art user equipment's 601 for soft handover is unnecessary since the user equipment 601 in the embodiments herein are completely surrounded by cells belonging to the same centralized baseband unit 610. Therefore, the user equipment 601 only needs to use soft combining for the RLS which are active. Since the user equipment 601 needs to use only one decoding resource in order to decode the soft combined RLS, the user equipment 601 is made more efficient in terms of capacity and cost.

Thus, the embodiments herein are applicable to old and current/new user equipment's. A old user equipment does no perform soft combining on several RLSs, i.e. the user equipment does not utilize the sum of power from several RLSs. An old UE selects only one of the RLSs, probably the one that has a "down" command (if several RLSs has "down") or a random RLSs if all RLS has an "up" command. A new user equipment can instead only do soft combining and utilize that the decoding of the UL-TPC command is based on the sum of power from several RLSs.

Step 710

The user equipment 601 controls its uplink power according to the result of soft combining.

Soft HO (Stationary)

Figure 1:
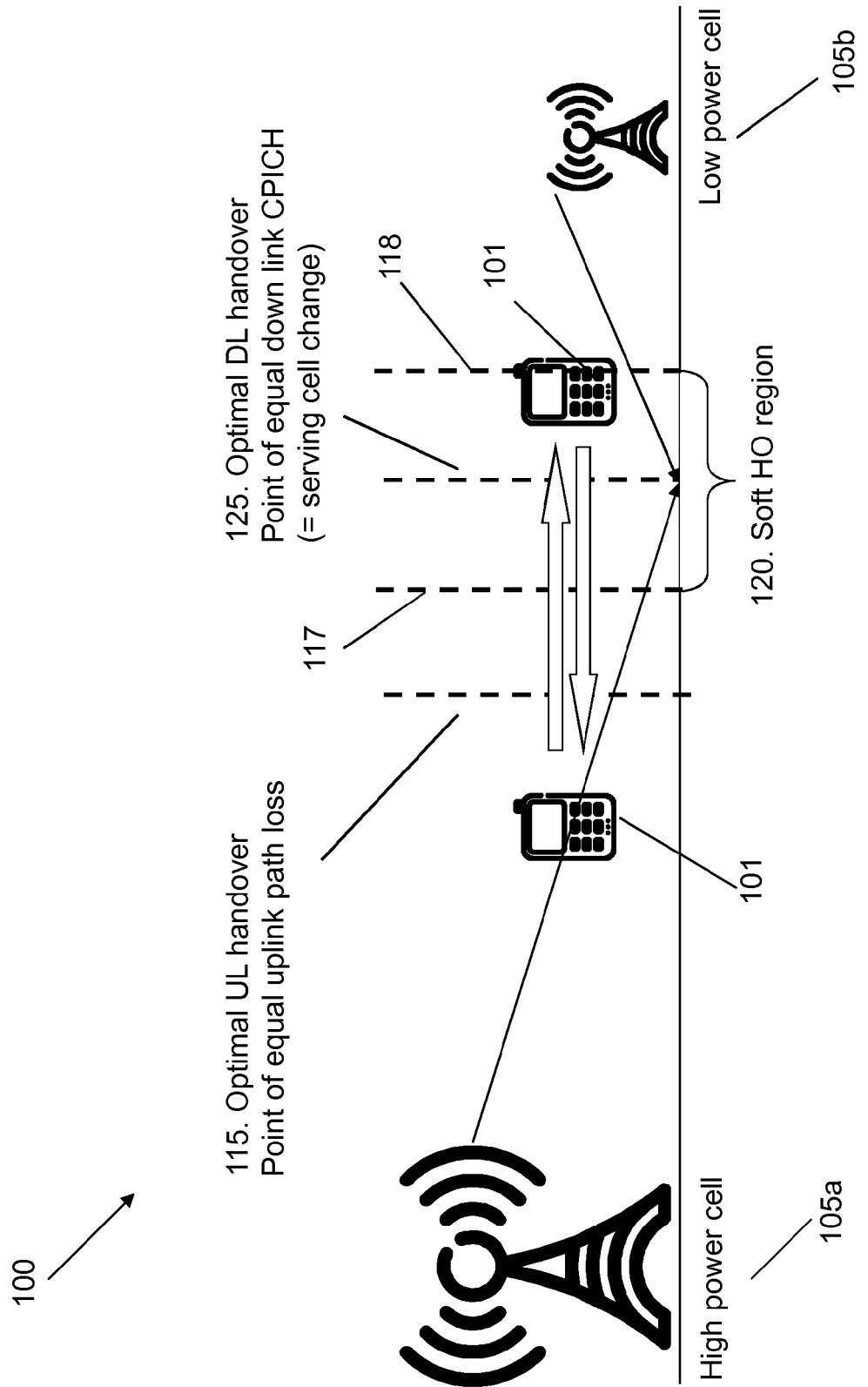
FIG. 1 is a schematic block diagram illustrating high power and low power cells.
Figure 2:
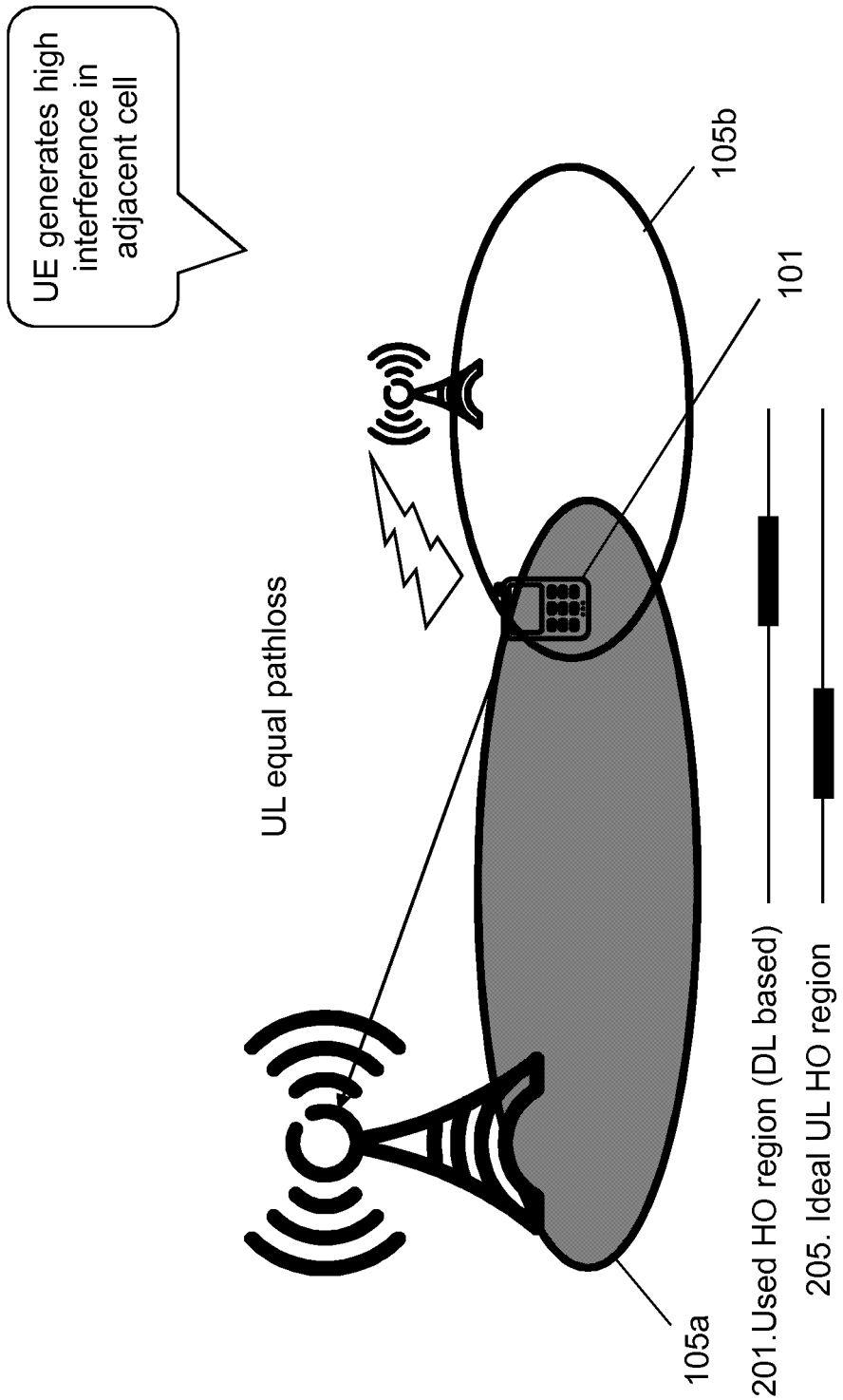
FIG. 2 is a schematic block diagram illustrating power settings in a communications network.
Figure 3:
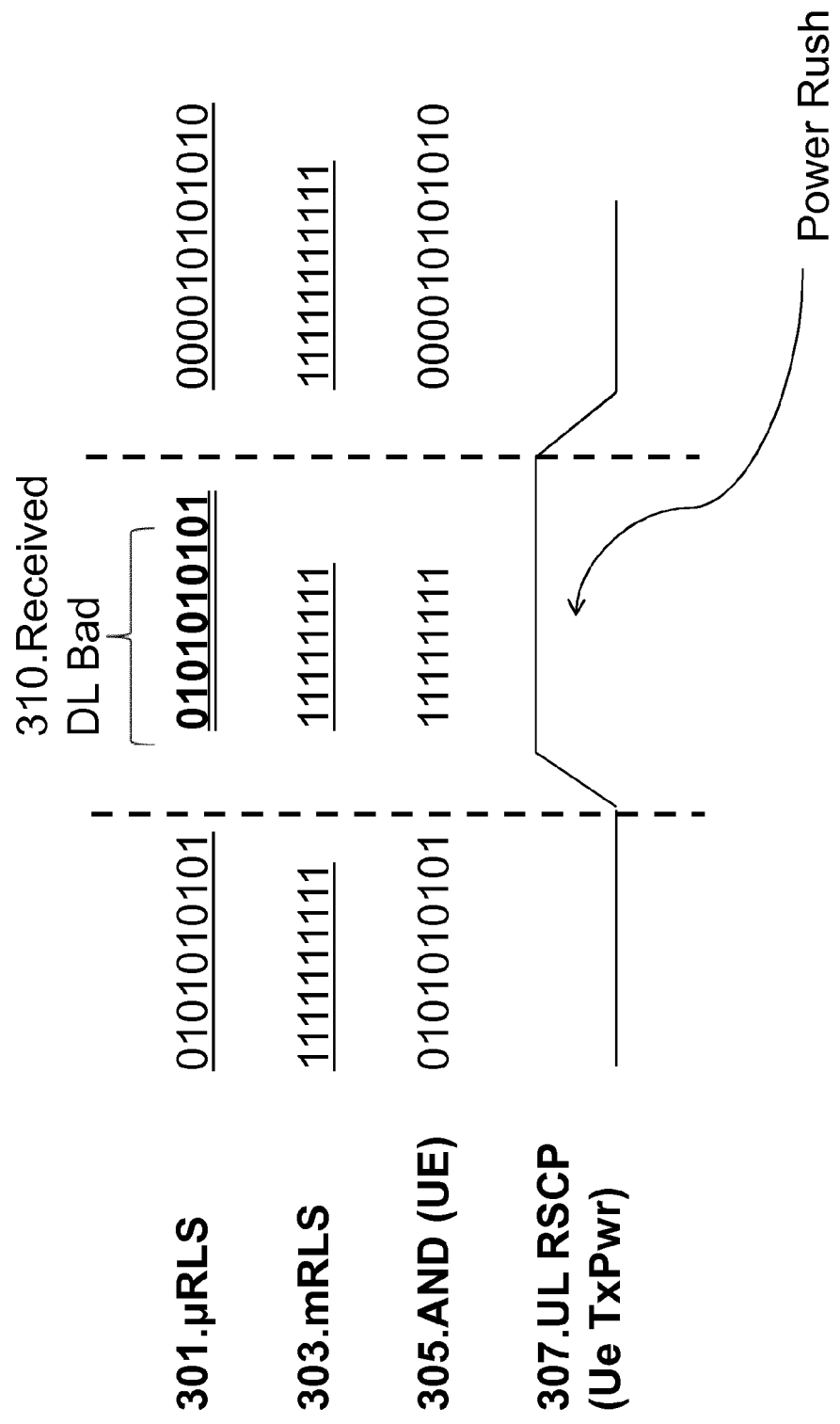
FIG. 3 is a diagram illustrating a non-coordinated soft handover scenario of a stationer user equipment.
Figure 10:
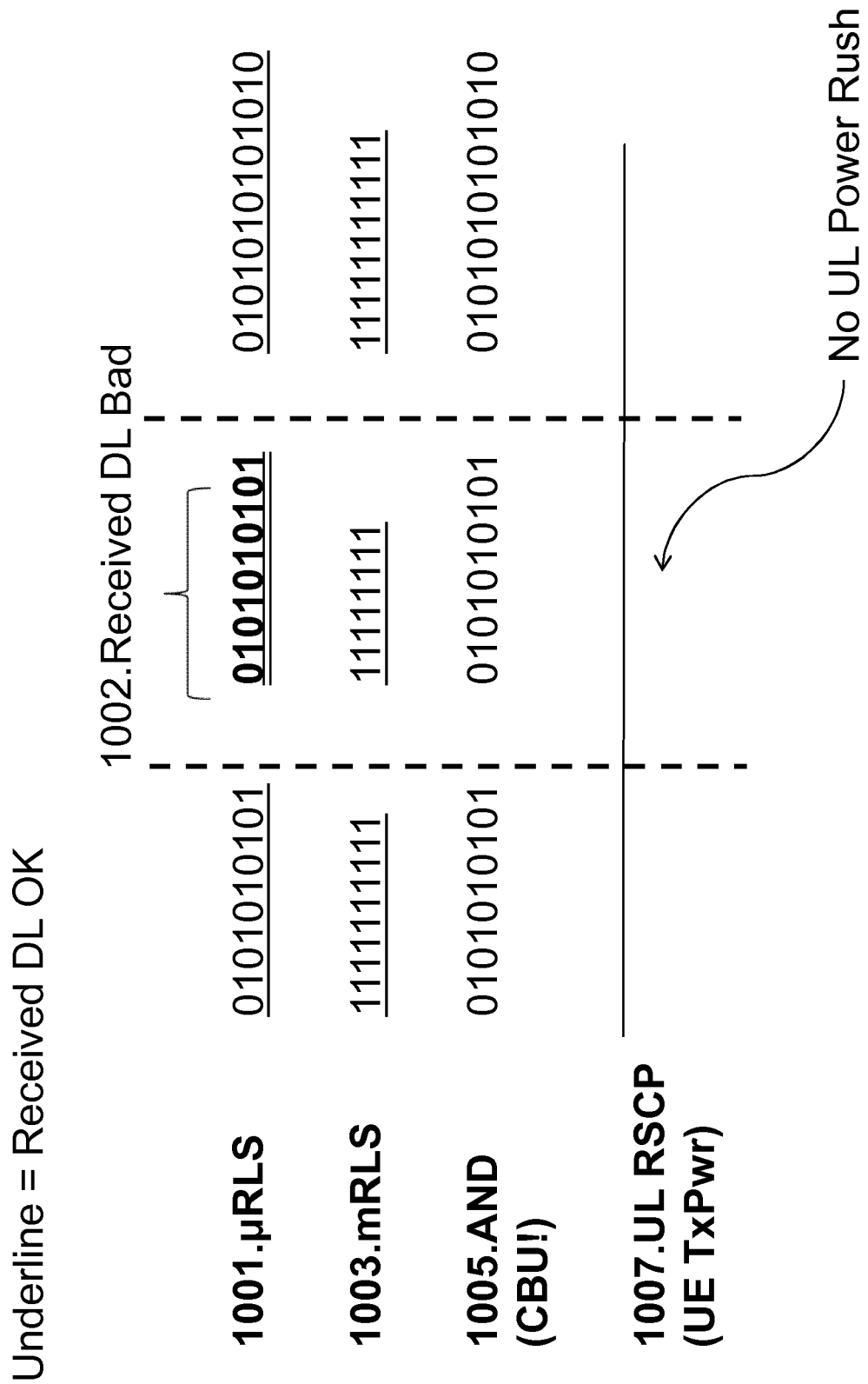
FIG. 10 is a diagram illustrating a coordinated soft handover scenario of a stationary use equipment.

FIG. 10 illustrates a scenario corresponding to the one illustrated in FIG. 3 where the user equipment 601 is stationary, i.e. it is not moving. The downlink is exposed to fading. To recap, the scenario in FIG. 3 illustrated UL-TPC streams in a non-coordinated soft handover scenario and an uplink power rush. In FIG. 10, illustrating a coordinated soft handover scenario, the uplink power rush of the first scenario is avoided by using the one common UL-TPC stream. In FIG. 10 and in the following description, the single underline indicates an ok downlink and the double underline indicates a bad downlink. Seen from the top, the first row in FIG. 10 illustrates the UL TPC command bit sequence for the micro cell, μRLS 1001. The second row in FIG. 10 illustrates the UL TPC command bit sequence for the macro cell, mRLS 1003. The third row in FIG. 10 illustrates a combination of the UL TPC command bit sequence for the micro cell μRLS 1001 and for the macro cell, mRLS 1003 for the user equipment 601, referred to as AND (CBU) 1005 in FIG. 10. The fourth row in FIG. 10 is a graph which illustrates the uplink RSCP for the transmission power of the user equipment, referred to as UL RSCP (UE TxPwr) 1007 in FIG. 10.

In FIG. 10 the UL TPC command bit sequence for the micro cell RLS, μRLS 1001, is exemplified to be 0101010101 0101010101 0101010101010. The UL TPC command for the μRLS 1001 between the dotted lines is associated with a bad downlink 1002. The bad downlink 1002 has the UL TPC command bit sequence 0101010101. The UL TPC command bit sequence for the macro cell RLS, mRLS 1003, is exemplified to comprise only ones 1111111111111111111111111111111. In this coordinated soft handover scenario, it is the centralized baseband unit 610 that performs the combining of the UL-TPC stream for the micro cell RLS with the UL TPC stream for the macro cell RLS, and the result, AND (CBU) 1005 is 0101010101 0101010101 0101010101010. As seen from the graph 1007 in the lower part of the FIG. 10, the instability in the micro cell and the macro cell has no effect anymore and does not lead to any power rush. This is due to the one common UL TPC command Soft HO Entry (Mobility)

Figure 4:
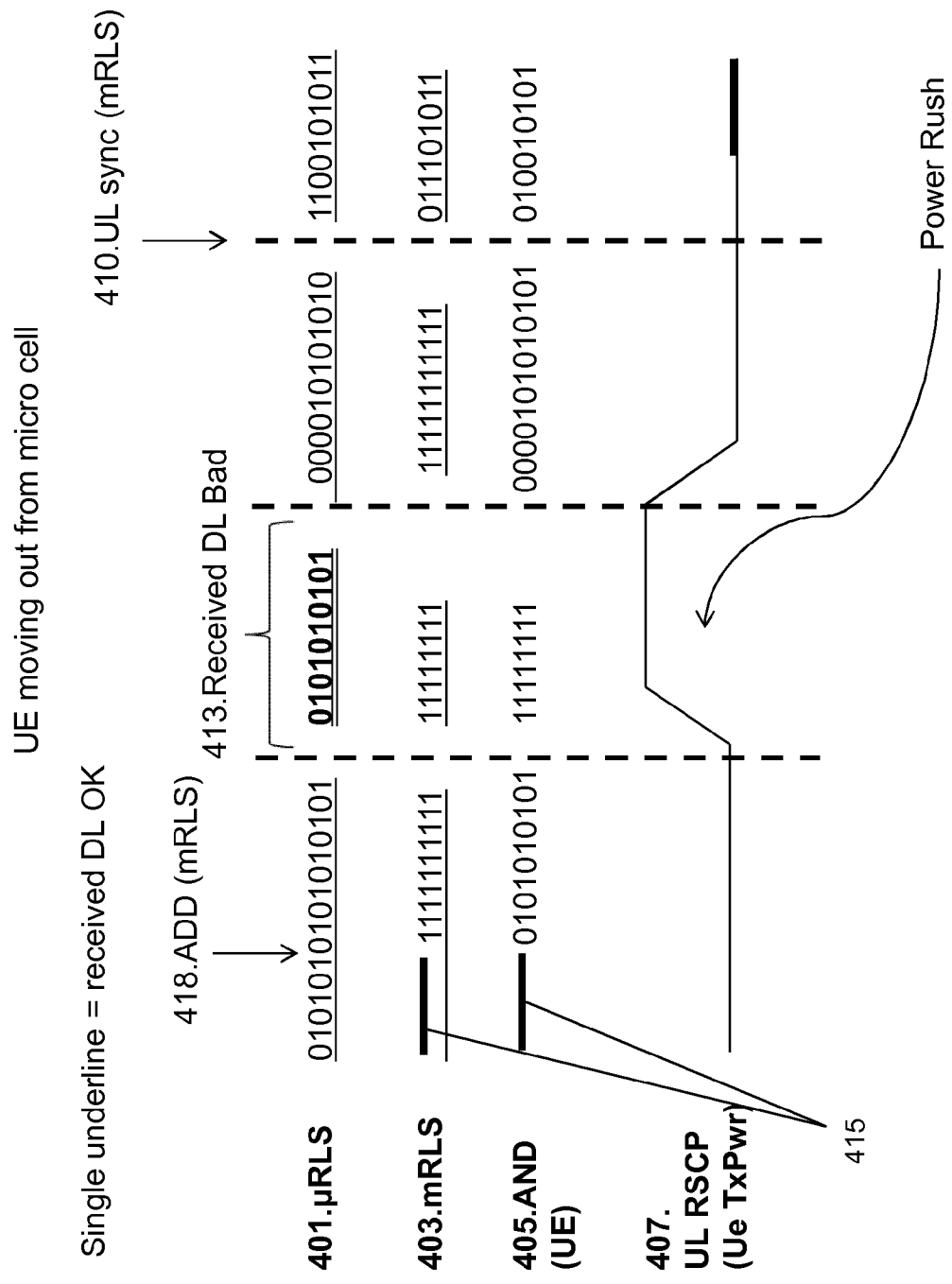
FIG. 4 is a diagram illustrating a non-coordinated soft handover of a user equipment moving out from a micro cell.
Figure 11:
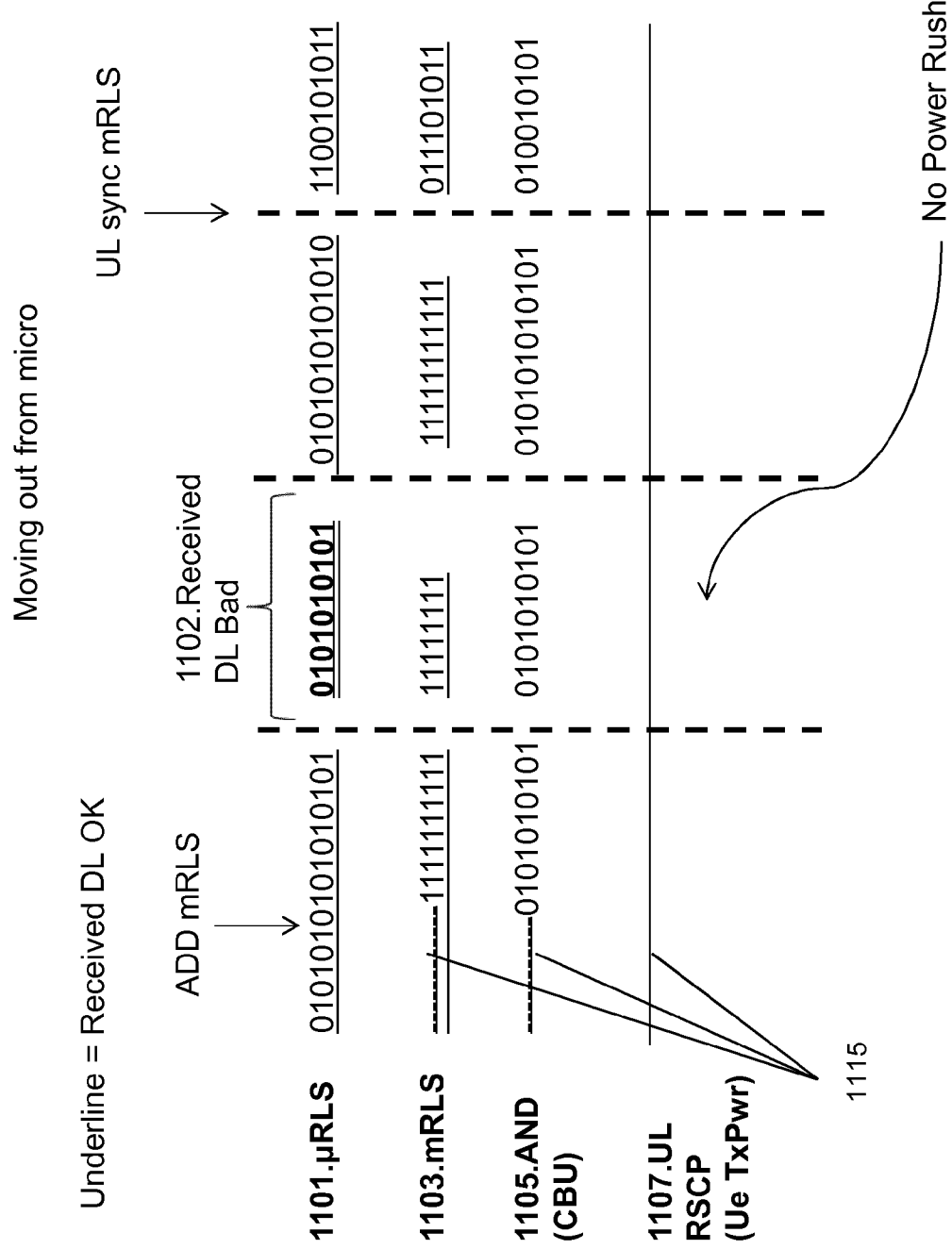
FIG. 11 is a diagram illustrating a coordinated soft handover of a user equipment moving out from a micro cell.

FIG. 11 illustrates mobility of the user equipment 601 in soft handover entry. The user equipment 601 moves out from the micro cell and enters soft handover with the macro cell, i.e. the user equipment 601 moves from the coverage area of the low power node to the coverage area of the macro node, while the user equipment 601 is still being located in the HO area. In FIG. 10, the single underline indicates an ok downlink and the double underline indicates a bad downlink. Seen from the top, the first row in FIG. 11 illustrates the UL TPC command bit sequence for the micro cell, μRLS 1101. The second row in FIG. 4 illustrates the UL TPC command bit sequence for the macro cell, mRLS 1103. The third row in FIG. 11 illustrates a combination of the UL TPC command bit sequence for the micro cell μRLS 401 and for the macro cell, mRLS 403 done by the centralized baseband unit 610 for the user equipment, referred to as AND (CBU) 1105 in FIG. 11. The fourth row in FIG. 11 is a graph which illustrates the uplink Received Signal Code Power (RSCP) for the transmission power of the user equipment, referred to as UL RSCP (UE TxPwr) 1107 in FIG. 11. After some time, uplink synchronization is performed between the μRLS 1101 and the mRLS 1103, denoted with UL Synch (mRLS) 1110 in FIG. 11.

In FIG. 11 the UL TPC command bit sequence for the μRLS 1101 is exemplified to be 0101010101010101 0101010101 01010101010101100101011. A bad downlink 1102 in the μRLS 1101 is associated with the UL TPC sequence 0101010101. In the start, when the user equipment 601 is located only in the micro cell there is no UL TPC sequence associated with the macro cell, illustrated with a continuous line 1115 in the mRLS 1103. When the user equipment 601 starts to enter soft HO with the macro cell, the UL-TPC power is 11111111111111111111111111111011101011.

The centralized baseband unit 610 performs the logical AND between the received sequences, the result of the combination is 0101010101 0101010101 010101010101 010010101. As seen from the graph illustrating the UL RSCP (Ue TxPwr) 1107, the bad downlink 1102 does not have any influence, and there is no power rush associated with the bad downlink 1102 as compared to the scenario illustrated in FIG. 4. The scenario in FIG. 11 may also be referred to as showing UL-TPC streams in a Coordinated SoftHO scenario. The downlink is exposed to fading in this scenario.

The centralized baseband unit 610 generating one common UL-TPC command stream for all remote radio units 605 suppresses uplink power rushes at uplink synchronization at radio link addition and the variance of uplink power is lowered, in the handover area.

Figure 12:
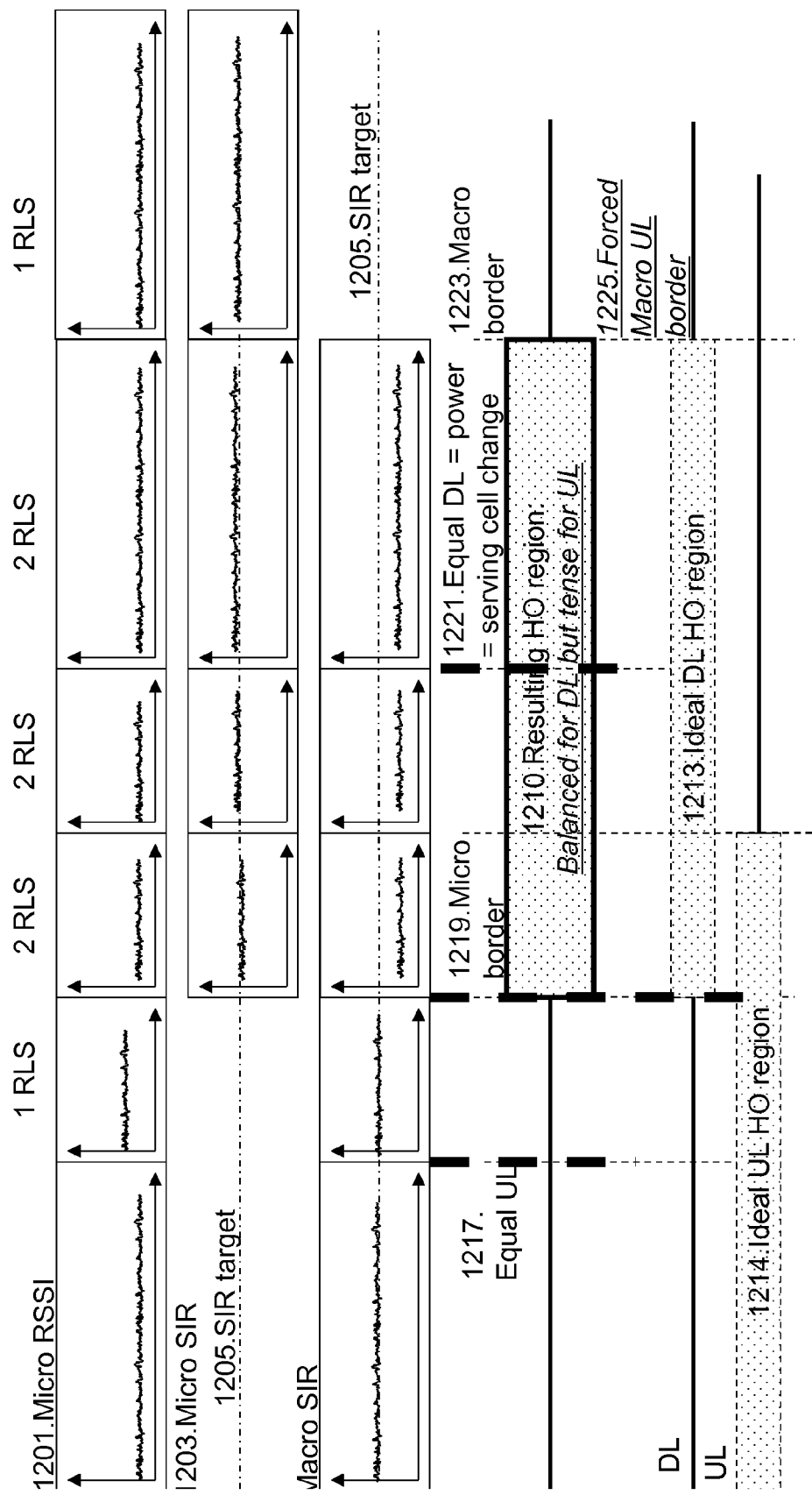
FIG. 12 is a graph showing uplink power.

FIG. 12 shows an uplink power graph with no power rushes in the micro cell in the handover region, due to use of the Coordinated Soft HO in an uplink/downlink imbalance scenario. The figure shows the impact on uplink power and SIR depending on the position of the user equipment 601. The macro node is assumed to be on the left and the low power node is assumed to be on the right.

Starting from the top of FIG. 12, the graphs in the first row represents the RRSI of the micro cell, denoted Micro RRSI 1201. Two graphs illustrate one RLS, three graphs illustrates two RLS. The second row illustrates the SIR for the micro cell, denoted Micro SIR 1203 in FIG. 12, where all three graphs illustrate two RLSs. The SIR target 1205 is illustrated with a horizontal line in the graphs illustrating Micro SIR 1203. The third row illustrates the SIR for the macro cell, denoted Macro SIR 1207 in FIG. 12 with the SIR target 1205 illustrated with a horizontal line. The Macro SIR 1207 is illustrated with one graph for one RLS and three graphs for two RLSs. The fourth row illustrates the resulting handover region 1210 which is seen to be balanced for the downlink, but tense for the uplink. The fifth row illustrates the ideal downlink handover region for the downlink, denoted Ideal DL HO region 1213 in FIG. 12. The sixth row illustrates the ideal downlink handover region for the uplink, denoted Ideal UL HO region 1215 in FIG. 12. Vertically, FIG. 12 illustrates different numbers of RLSs. The x-axis of all graphs in FIG. 12 represents the time and the y-axis in FIG. 12 represents the power. A thick vertical dotted line illustrates where the uplink is equal, dented equal UL 1217 in FIG. 12. The equal uplink 1217 is seen in FIG. 12 to be in the ideal UL HO region 1214. Another thick vertical dotted line illustrates the micro border 1219. One thick vertical dotted line illustrates the equal DL 1221. A thin vertical line illustrates the macro border 1223, which is seen to be at the same point as the forced macro UL border 1225.

Figure 5:
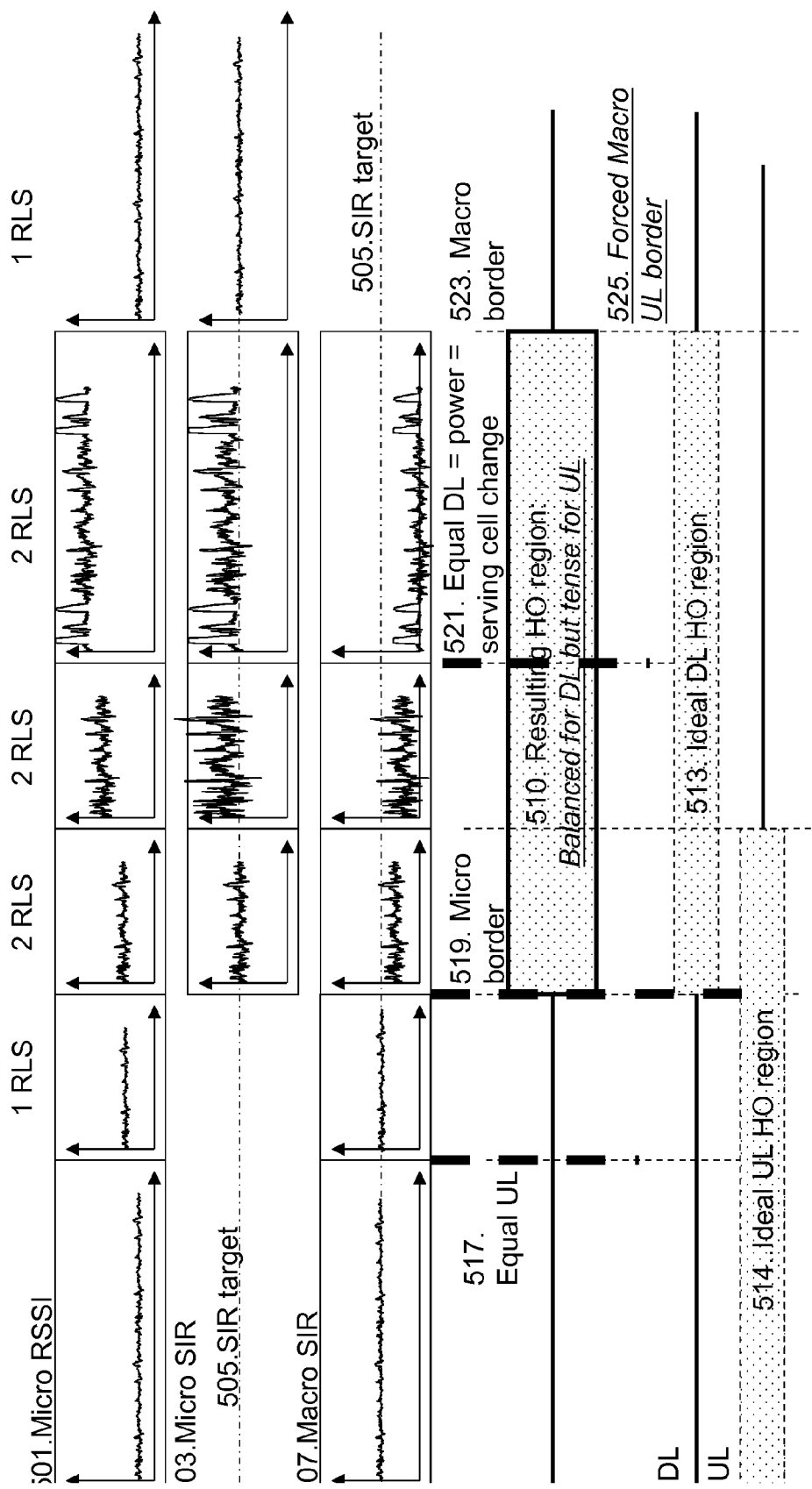
FIG. 5 is a graph illustrating imbalance in uplink power.

FIG. 12 shows an uplink power graph with power rushes in the micro cell in the HO region, due to use of legacy Soft HO in an UL/DL imbalance scenario. In the FIG. 12 it is seen that the ideal HO region for the uplink12 and the ideal HO region for the downlink 1213 only partly overlaps, however this does not causes any with unstable uplink power control. Compared to FIG. 5 illustrating the non-coordinated soft handover scenario, the coordinated soft handover scenario shown in FIG. 12 has no power rushes or imbalance.

Figure 13:
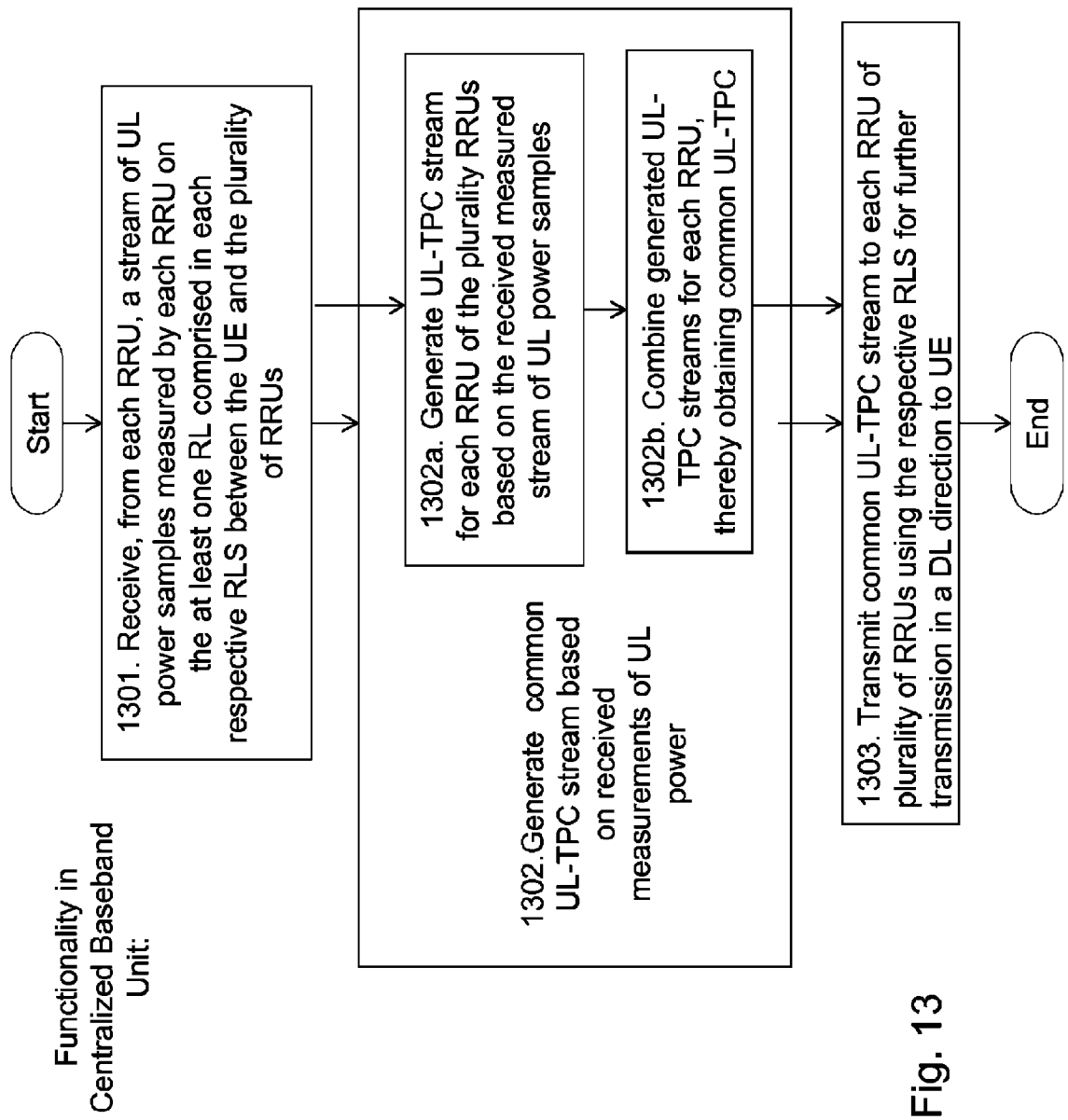
FIG. 13 is a flow chart illustrating embodiments of a method in a centralized baseband unit.

The method described above will now be described seen from the perspective of the centralized baseband unit 610. FIG. 13 is a flowchart describing the present method in the centralized baseband unit 610, for generating a common UL-TPC command stream in a communications network 600. As mentioned above, the centralized baseband unit 610 is configured to be connected to a plurality of remote radio units 605a, 605b. Each remote radio unit 605a, 605b of the plurality of remote radio units 605a, 605b is configured to be connected to a user equipment 601 via a respective RLS of a plurality of RLSs. Each respective RLS comprises at least one radio link 607. The user equipment 601 may be performing a soft handover from a first remote radio unit 605a to a second remote radio unit 605b of the plurality of remote radio units 605a, 605b. The communications network 600 may be a heterogeneous network comprising a plurality of cells with different downlink capabilities. Each remote radio unit 605a, 605b may be configured to perform radio band processing and the centralized baseband unit 610 may be configured to perform baseband processing. The method comprises the further steps to be performed by the centralized baseband unit 610:

Step 1301

Figure 7:
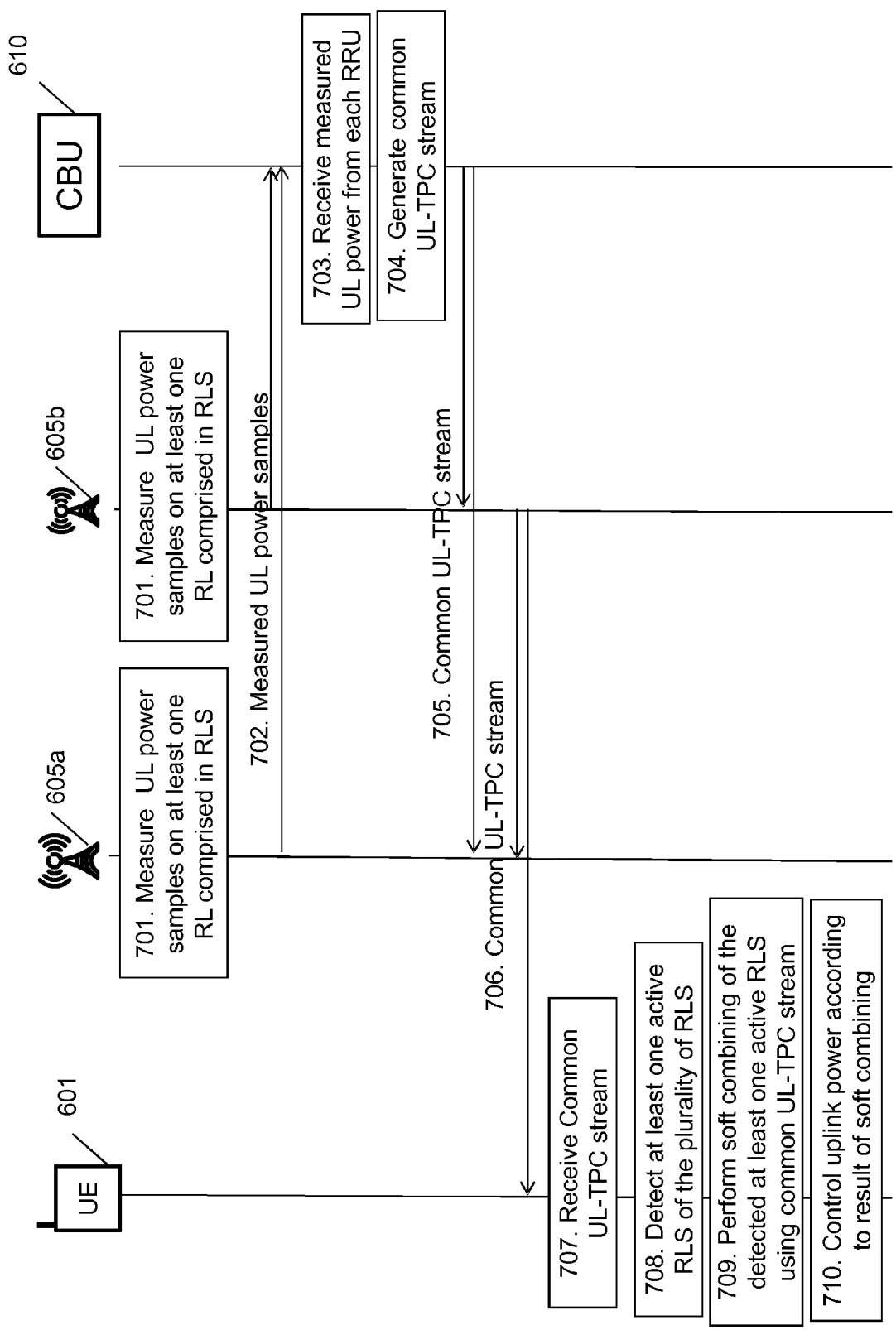
FIG. 7 is a combined signaling diagram and flow chart illustrating embodiments of a method in a communications network.

This step corresponds to step 703 in FIG. 7.

The centralized baseband unit 610 receives, from each remote radio unit 605a, 605b a stream of uplink power samples measured for each remote radio unit 605a, 605b on the at least one radio link 607 comprised in each respective RLS between the user equipment 601 and the plurality of remote radio units 605a, 605b.

In some embodiments, the received stream of uplink power samples is associated with at least one of a SIR associated with each RLS of the plurality of RLS and a RoT measurement associated with each remote radio unit 605a, 605b of the plurality of remote radio units 605a, 605b based on the plurality of RLS. There is one SIR per RLS in the uplink and one ROT per cell in the uplink.

Step 1302

This step corresponds to step 704 in FIG. 7.

The centralized baseband unit 610 generates the common UL-TPC command stream based on the received measurements of uplink power. The common UL-TPC command stream is to be sent to each remote radio unit 605a, 605b for further transmission to the user equipment 601.

In some embodiments, the common UL-TPC command stream is generated based on at least one of the SIR associated with each remote radio unit 605a, 605b of the plurality of remote radio units 605a, 605b, a SIR target, a pilot BER and the RoT measurements associated with each remote radio unit of the plurality of remote radio units 605a, 605b. SIR target is a quality parameter set by a Radio Network Controller (RNC) and sent to the centralized base band unit 610. The SIR target is used to ensure that the received signal quality on the uplink remains sufficient for the required radio connection quality (e.g. to uphold a target BLER).

The uplink SIR target is the same for all radio links on all remote radio units 605a, 605b in active set. If SIR>SIR_target then the TPC command to transmit is "0", while if SIR<SIR_target then the TPC command to transmit is "1".

Step 1302a

This is a substep of step 1302. In some embodiments, the centralized baseband unit 610 generates an UL-TPC stream for each remote radio unit 605a, 605b of the plurality of remote radio units 605a, 605b based on the received measured stream of uplink power samples. This is exemplified in FIG. 9.

Step 1302b

This is a substep of step 1302, and a step that is performed after step 1302a. In some embodiments, the centralized baseband unit 610 combines the generated UL-TPC streams for each remote radio unit 605a, 605b, thereby obtaining the common UL-TPC. When the centralized baseband unit 610 combines the generated UL-TPC streams for each remote radio unit 605a, 605b it may use an AND function, as exemplified in FIG. 9.

Step 1303

This step corresponds to steps 705 and 706 in FIG. 7.

The centralized baseband unit 610 transmits the common UL-TPC command stream to each remote radio unit 605a, 605b of the plurality of remote radio units 605a, 605b using the respective RLS for further transmission in a downlink direction to the user equipment 601. Thus, the centralized baseband unit 610 has an influence on the uplink transmission power of the user equipment 601 by sending the common UL-TPC command stream to the user equipment 601. The user equipment 601 will increase or decrease its uplink transmission power according to the common UL-TPC stream.

Figure 14:
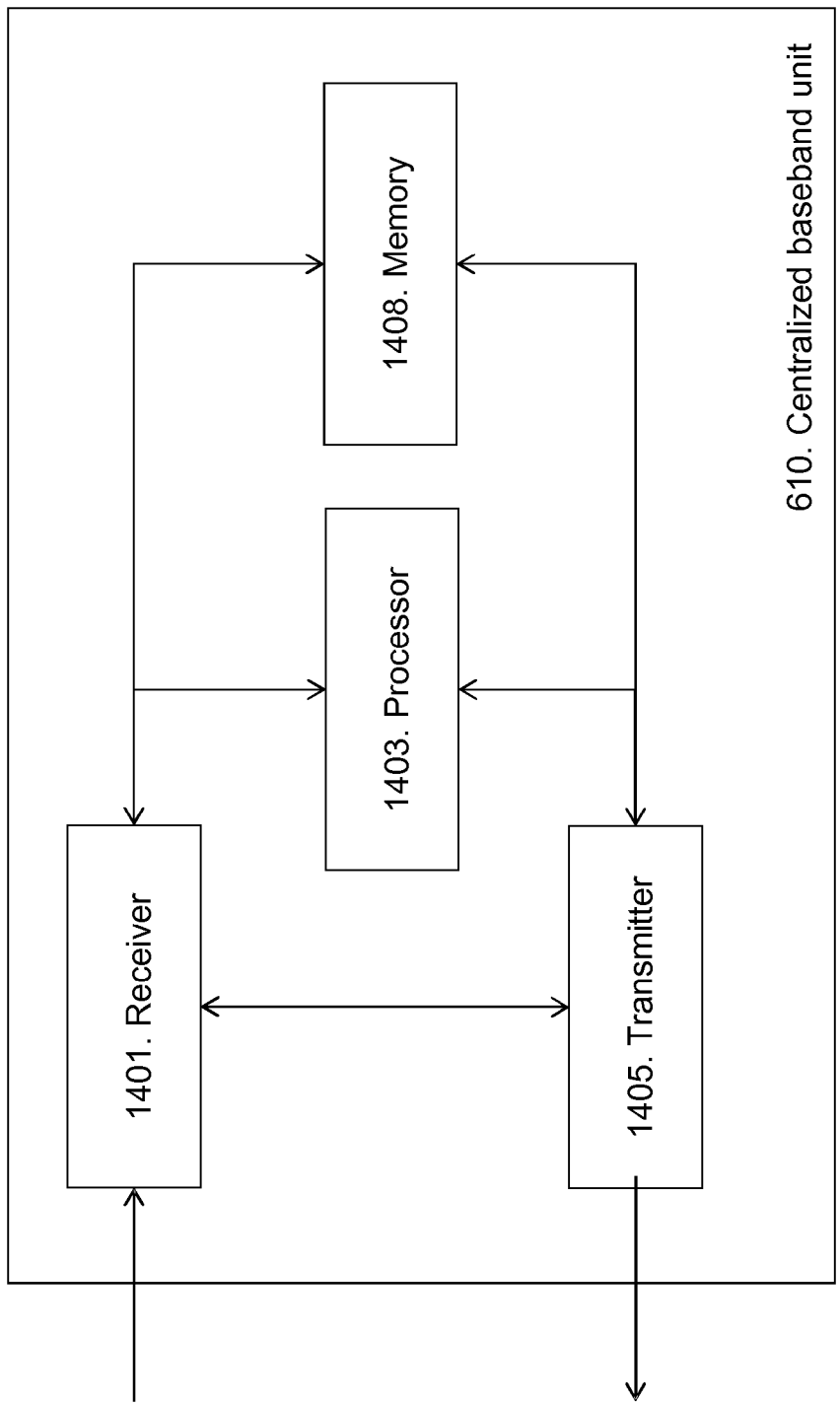
FIG. 14 is a schematic block diagram illustrating embodiments of a centralized baseband unit.

To perform the method steps shown in FIG. 13 for generating a common UL-TPC command stream in the communications network 600 the centralized baseband unit 610 comprises an arrangement as shown in FIG. 14. The centralized baseband unit 610 is configured to be connected to a plurality of remote radio units 605a, 605b. Each remote radio unit 605a, 605b of the plurality of remote radio units 605a, 605b is configured to be connected to a user equipment 601 via a respective RLS of a plurality of RLSs. Each respective RLS comprises at least one radio link 607. In some embodiments, the user equipment 601 is configured to perform a soft handover from a first remote radio unit 605a to a second remote radio unit 605b of the plurality of remote radio units 605a, 605b. In some embodiments, the communications network 600 is a heterogeneous network comprising a plurality of cells with different downlink capabilities. In some embodiments, each remote radio unit 605a, 605b is configured to perform radio band processing and wherein the centralized baseband unit 610 is configured to perform baseband processing.

The centralized baseband unit 610 comprises a receiver 1401 which is configured to receive, from each remote radio unit 605 a stream of uplink power samples measured for each remote radio unit 605a, 605b on the at least one radio link 607 comprised in each respective RLS between the user equipment 601 and the plurality of remote radio units 605a, 605b. In some embodiments, the received stream of uplink power samples is associated with at least one of the SIR associated with each RLS of the plurality of RLS and a RoT parameter associated with each remote radio unit 605a, 605b of the plurality of remote radio units 605a, 605b based on the plurality of RLS.

The centralized baseband unit 610 comprises a processor 1403 which is configured to generate the common UL-TPC command stream based on the received measurements of uplink power. The common UL-TPC command stream is to be sent to each remote radio unit 605a, 605b for further transmission to the user equipment 601. In some embodiments, the processor 1403 is further configured to generate an UL-TPC stream for each remote radio unit 605a, 605b of the plurality of remote radio units 605a, 605b based on the received measured stream of uplink power samples, and to combine the generated UL-TPC streams for each remote radio unit 605a, 605b, thereby obtaining the common UL-TPC. In some embodiments, the common UL-TPC command stream is generated based on at least one of the SIR associated with each remote radio unit 605a, 605b of the plurality of remote radio units 605a, 605b, a SIR target and the RoT parameter associated with each remote radio unit of the plurality of remote radio units 605a, 605b.

In some embodiments, the centralized baseband unit 610 further comprises a transmitter 1405 configured to transmit the common UL-TPC command stream to each remote radio unit 605a, 605b of the plurality of remote radio units 605a, 605b using the respective RLS for further transmission in a downlink direction to the user equipment 601. In other words, each radio link via each involved remote radio unit 650a, 605b.

The centralized baseband unit 610 may further comprise a memory 1408 comprising one or more memory units. The memory 1408 is arranged to be used to store data, received data streams, received stream of uplink power samples measured, the common UL-TPC stream, UL-TPC streams for each remote radio unit, the SIR, the SIR target, pilot BER, the RoT, threshold values, time periods, configurations, schedulings, and applications to perform the methods herein when being executed in the radio centralized baseband unit 610.

Those skilled in the art will also appreciate that the receiver 1401 and the transmitter 1405 described above may refer to a combination of analog and digital circuits, and/or one or more processors configured with software and/or firmware, e.g. stored in the memory 1408, that when executed by the one or more processors such as the processor 1403 perform as described above. One or more of these processors, as well as the other digital hardware, may be comprised in a single application-specific integrated circuit (ASIC), or several processors and various digital hardware may be distributed among several separate components, whether individually packaged or assembled into a system-on-a-chip (SoC).

Figure 15:
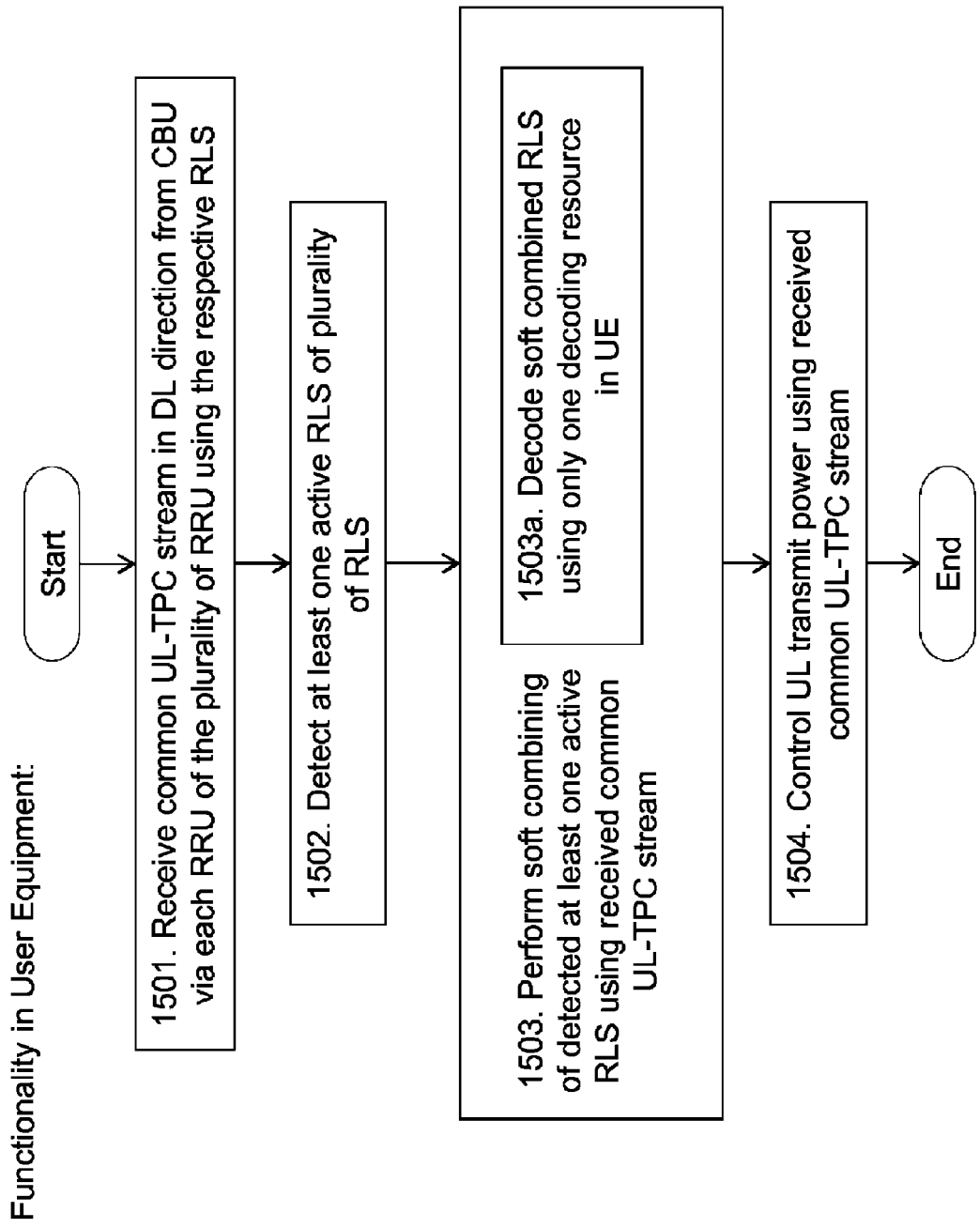
FIG. 15 is a flow chart illustrating embodiments of a method in a user equipment.

The method described above will now be described seen from the perspective of the user equipment 601. FIG. 15 is a flowchart describing the present method in the user equipment 601 for generating a common UL-TPC command stream in a communications network 600. The user equipment 601 is configured to be connected to a plurality of remote radio units 605a, 605b via a plurality of RLS. Each respective RLS comprises at least one radio link 607. The plurality of remote radio units 605 is configured to be connected to a centralized baseband unit 610. In some embodiments, the user equipment 601 is performing a soft handover from a first remote radio unit 605a to a second remote radio unit 605b of the plurality of remote radio units 605a, 605b. In some embodiments, the communications network 600 is a heterogeneous network comprising a plurality of cells with different downlink capabilities. The method comprises the further steps to be performed by the user equipment 601:

Step 1501

This step corresponds to step 707 in FIG. 7.

The user equipment 601 receives in each radio link a copy of the same common UL-TPC command stream in a downlink direction from the centralized baseband unit 610 via each remote radio unit 605a, 605b of the plurality of remote radio units 605a, 605b using the respective RLS.

Step 1502

This step corresponds to step 708 in FIG. 7.

The user equipment 601 detects at least one active RLS of the plurality of RLS.

Step 1503

This step corresponds to step 709 in FIG. 7.

The user equipment 601 performs soft combining, i.e. before decoding the UL-TPC bits and other, of the detected at least one active RLS using the received common UL-TPC stream.

Step 1503a

This is a substep of step 1503. In some embodiments, the user equipment 601 decodes the soft combined RLS using only one decoding resource in the user equipment 601.

Step 1504

This step corresponds to step 710 in FIG. 7.

In some embodiments, the user equipment 601 controls uplink transmit power using the received common UL-TPC stream.

Figure 16:
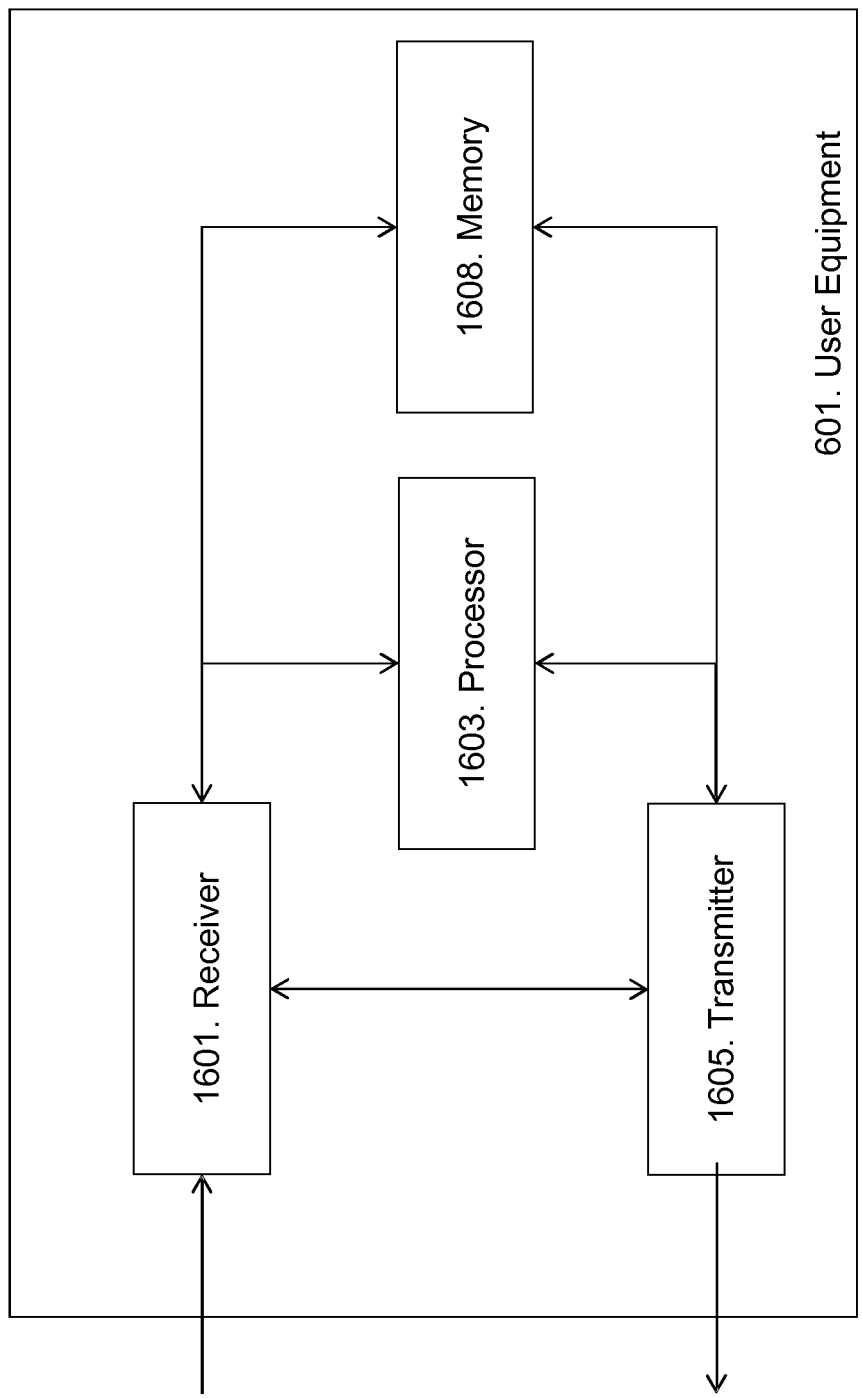
FIG. 16 is a schematic block diagram illustrating embodiments of a user equipment.

To perform the method steps shown in FIG. 15 for generating a common UL-TPC command stream in the communications network 600 the user equipment 601 comprises an arrangement as shown in FIG. 16. The user equipment 601 is configured to be connected to a plurality of remote radio units 605a, 605b via a plurality of RLS. Each respective RLS comprises at least one radio link 607. The plurality of remote radio units 605 is configured to be connected to a centralized baseband unit 610. 25. In some embodiments, the user equipment 601 is performing a soft handover from a first remote radio unit 605a to a second remote radio unit 605b of the plurality of remote radio units 605a, 605b. In some embodiments, the communications network 600 is a heterogeneous network comprising a plurality of cells with different downlink capabilities.

The user equipment 601 comprises a receiver 1601 which is configured to receive a common UL-TPC command stream in a downlink direction from the centralized baseband unit 610 via each remote radio unit 605a, 605b of the plurality of remote radio units 605a, 605b using the respective RLS.

The user equipment 601 comprises a processor 1603 which is configured to detect at least one active RLS of the plurality of RLS, and to perform soft combining of the detected at least one active RLS using the received common UL-TPC stream. In some embodiments, the processor 1603 is further configured to decode the soft combined RLS using only one decoding resource in the user equipment 601. In some embodiments, the processor 1603 is further configured to control uplink transmit power using the received common UL-TPC stream, i.e. to decrease or increase the uplink transmit power.

The user equipment 601 may further comprise a transmitter 1605 configured to transmit data to the remote radio units 605a, 605b using the controlled uplink transmit power.

The user equipment 601 may further comprise a memory 1608 comprising one or more memory units. The memory 1608 is arranged to be used to store data, received data streams, received stream of uplink power samples measured, the common UL-TPC stream, threshold values, time periods, configurations, schedulings, and applications to perform the methods herein when being executed in the radio user equipment 601.

The present mechanism for generating a common uplink transmit power control, UL-TPC, stream in a communications network 600 may be implemented through one or more processors, such as the processor 1403 in the centralized baseband unit arrangement depicted in FIG. 14 and the processor 1603 in the user equipment arrangement depicted in FIG. 16, together with computer program code for performing the functions of the embodiments herein. The processor may be for example a Digital Signal Processor (DSP), Application Specific Integrated Circuit (ASIC) processor, Field-programmable gate array (FPGA) processor or microprocessor. The program code mentioned above may also be provided as a computer program product, for instance in the form of a data carrier carrying computer program code for performing the embodiments herein when being loaded into the centralized baseband unit 610 and/or user equipment 601. One such carrier may be in the form of a CD ROM disc. It is however feasible with other data carriers such as a memory stick. The computer program code may furthermore be provided as pure program code on a server and downloaded to the centralized baseband unit 610 and/or user equipment 601.

Those skilled in the art will also appreciate that the receiver 1601 and the transmitter 1605 described above may refer to a combination of analog and digital circuits, and/or one or more processors configured with software and/or firmware, e.g. stored in the memory 1608, that when executed by the one or more processors such as the processor 1603 perform as described above. One or more of these processors, as well as the other digital hardware, may be comprised in a single application-specific integrated circuit (ASIC), or several processors and various digital hardware may be distributed among several separate components, whether individually packaged or assembled into a system-on-a-chip (SoC).

The embodiments herein are not limited to the above described embodiments. Various alternatives, modifications and equivalents may be used. Therefore, the above embodiments should not be taken as limiting the scope of the embodiments, which is defined by the appending claims.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements.

It should also be emphasised that the steps of the methods defined in the appended claims may, without departing from the embodiments herein, be performed in another order than the order in which they appear in the claims.

The invention claimed is:

1. A method in a centralized baseband unit for generating a common uplink transmit power control (UL-TPC) command stream in a communications network, the centralized baseband unit being configured to be connected to a plurality of remote radio units, wherein each remote radio unit of the plurality of remote radio units is configured to be connected to a same user equipment via a respective Radio Link Set (RLS) of a plurality of RLSs, wherein each respective RLS comprises at least one radio link, the method comprising:
   receiving, from each remote radio unit a respective one of a plurality of streams of uplink power samples measured for each remote radio unit on the at least one radio link comprised in each respective RLS between the same user equipment and the plurality of remote radio units; and
   generating the common UL-TPC command stream based on the received plurality streams of uplink power sample measurements, where the common UL-TPC command stream is to be sent to each remote radio unit for further transmission of the common UL-TPC command stream from said each remote radio unit to the same user equipment,
   wherein radio band and baseband processing are performed in separate units, and
   wherein each remote radio unit is configured to perform radio band processing and wherein the centralized baseband unit is configured to perform baseband processing.

2. The method according to claim 1, further comprising:
   transmitting the common UL-TPC command stream to each remote radio unit of the plurality of remote radio units using the respective RLS for further transmission in a downlink direction to the same user equipment.

3. The method according to claim 1, wherein generating the common UL-TPC command stream based on the plurality of streams of uplink power sample measurements further comprises:
   generating an UL-TPC command stream for each remote radio unit of the plurality of remote radio units based on a respective one of the received stream of uplink power sample measurements; and
   combining the generated UL-TPC command stream for each remote radio unit, thereby obtaining the common UL-TPC command stream.

4. The method according to claim 1, wherein the received streams of uplink power sample measurements are each associated with at least one of a signal to noise interference ratio (SIR) associated with each RLS of the plurality of RLS and a rise over thermal (RoT) measurement associated with each remote radio unit of the plurality of remote radio units based on the plurality of RLS.

5. The method according to claim 3, wherein the common UL-TPC command stream is generated based on at least one of the SIR associated with each remote radio unit of the plurality of remote radio units, a SIR target, a pilot bit error rate (BER) and the RoT measurement associated with each remote radio unit of the plurality of remote radio units.

6. The method according to claim 1, wherein the same user equipment is performing a soft handover from a first remote radio unit to a second remote radio unit of the plurality of remote radio units.

7. The method according to claim 1, wherein the communications network is a heterogeneous network comprising a plurality of cells with different downlink capabilities.

8. A method in a user equipment for receiving a common uplink transmit power control (UL-TPC) command stream in a communications network, wherein the user equipment is configured to be concurrently connected to a plurality of remote radio units via a plurality of radio link set (RLS) wherein each respective RLS comprises at least one radio link, and wherein the plurality of remote radio units is configured to be connected to a centralized baseband unit the method comprising:
   receiving a common UL-TPC command stream in a downlink direction from the centralized baseband unit via each remote radio unit of the plurality of remote radio units using the respective RLS;
   detecting at least one active RLS of the plurality of RLS; and
   performing soft combining of the detected at least one active RLS using the received common UL-TPC command stream,
   wherein radio band and baseband processing are performed in separate units, and
   wherein each remote radio unit is configured to perform radio band processing and wherein the centralized baseband unit is configured to perform baseband processing.

9. The method according to claim 8, wherein performing soft combining further comprises:
   decoding the soft combined RLS using only one decoding resource in the user equipment.

10. The method according to claim 8, further comprising:
    controlling uplink transmit power using the received common UL-TPC command stream.

11. The method according to claim 8, wherein the user equipment is performing a soft handover from a first remote radio unit to a second remote radio unit of the plurality of remote radio units.

12. The method according to claim 8, wherein the communications network is a heterogeneous network comprising a plurality of cells with different downlink capabilities.

13. A centralized baseband unit configured to generate a common uplink transmit power control (UL-TPC) command stream, the centralized baseband unit being comprised in a communications network, the centralized baseband unit being configured to be connected to a plurality of remote radio units, wherein each remote radio unit of the plurality of remote radio units is configured to be connected to a same user equipment via a respective Radio Link Set (RLS) of a plurality of RLSs, wherein each respective RLS comprises at least one radio link, the centralized baseband unit comprises:
   a receiver configured to receive, from each remote radio unit a respective one of a plurality of streams of uplink power samples measured for each remote radio unit on the at least one radio link comprised in each respective RLS between the same user equipment and the plurality of remote radio units; and
   a processor configured to generate the common UL-TPC command stream based on the received plurality of streams of uplink power sample measurements, where the common UL-TPC command stream is to be sent to each remote radio unit for further transmission of the common UL-TPC command stream from said each remote radio unit to the same user equipment,
   wherein radio band and baseband processing are performed in separate units, and
   wherein each remote radio unit is configured to perform radio band processing and wherein the centralized baseband unit is configured to perform baseband processing.

14. The centralized baseband unit according to claim 13, further comprising:
a transmitter configured to transmit the common UL-TPC command stream to each remote radio unit of the plurality of remote radio units using the respective RLS for further transmission in a downlink direction to the same user equipment.

15. The centralized baseband unit according to claim 13, wherein the processor is further configured to:
generate an UL-TPC command stream for each remote radio unit of the plurality of remote radio units based on a respective one of the received stream of uplink power sample measurements; and to
combine the generated UL-TPC command stream for each remote radio unit, thereby obtaining the common UL-TPC command stream.

16. The centralized baseband unit according to claim 13, wherein the received streams of uplink power sample measurements are each associated with at least one of the signal to noise interference ratio (SIR) associated with each RLS of the plurality of RLS and a rise over thermal (RoT) measurement associated with each remote radio unit of the plurality of remote radio units based on the plurality of RLS.

17. The centralized baseband unit according to claim 13, wherein the common UL-TPC command stream is generated based on at least one of the SIR associated with each remote radio unit of the plurality of remote radio units, a SIR target, a pilot bit error rate (BER), and the RoT measurement associated with each remote radio unit of the plurality of remote radio units.

18. The centralized baseband unit according to claim 13, wherein the same user equipment is configured to perform a soft handover from a first remote radio unit to a second remote radio unit of the plurality of remote radio units.

19. The centralized baseband unit according to claim 13, wherein the communications network is a heterogeneous network comprising a plurality of cells with different downlink capabilities.

20. A user equipment for receiving a common uplink transmit power control (UL-TPC) command stream, wherein the user equipment is comprised in a communications network, wherein the user equipment is configured to be concurrently connected to a plurality of remote radio units via a plurality of radio link set (RLS) wherein each respective RLS comprises at least one radio link, and wherein the plurality of remote radio units is configured to be connected to a centralized baseband unit, the user equipment comprises:
a receiver configured to receive a common UL-TPC command stream in a downlink direction from the centralized baseband unit via each remote radio unit of the plurality of remote radio units using the respective RLS; and
a processor configured to:
detect at least one active RLS of the plurality of RLS; and to
perform soft combining of the detected at least one active RLS using the received common UL-TPC command stream,
wherein radio band and baseband processing are performed in separate units, and
wherein each remote radio unit is configured to perform radio band processing and wherein the centralized baseband unit is configured to perform baseband processing.

21. The user equipment according to claim 20, wherein the processor is further configured to decode the soft combined RLS using only one decoding resource in the user equipment.

22. The user equipment according to claim 20, wherein the processor is further configured to control uplink transmit power using the received common UL-TPC command stream.

23. The user equipment according to claim 20, wherein the user equipment is configured to perform a soft handover from a first remote radio unit to a second remote radio unit of the plurality of remote radio units.

24. The user equipment according to claim 20, wherein the communications network is a heterogeneous network comprising a plurality of cells with different downlink capabilities.

* * * * *